(12) United States Patent
Kidani

(10) Patent No.: US 12,477,148 B2
(45) Date of Patent: Nov. 18, 2025

(54) IMAGE DECODING DEVICE, IMAGE DECODING METHOD, AND PROGRAM

(71) Applicant: KDDI CORPORATION, Tokyo (JP)

(72) Inventor: Yoshitaka Kidani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 19 days.

(21) Appl. No.: 18/588,550

(22) Filed: Feb. 27, 2024

(65) Prior Publication Data

US 2024/0205451 A1 Jun. 20, 2024

Related U.S. Application Data

(63) Continuation of application No. PCT/JP2022/030193, filed on Aug. 5, 2022.

(30) Foreign Application Priority Data

Sep. 27, 2021 (JP) .................. 2021-157280

(51) Int. Cl.
*H04N 19/119* (2014.01)
*H04N 19/105* (2014.01)
(Continued)

(52) U.S. Cl.
CPC ......... *H04N 19/577* (2014.11); *H04N 19/105* (2014.11); *H04N 19/107* (2014.11); *H04N 19/119* (2014.11); *H04N 19/132* (2014.11); *H04N 19/137* (2014.11); *H04N 19/159* (2014.11); *H04N 19/174* (2014.11); *H04N 19/176* (2014.11); *H04N 19/46* (2014.11); *H04N 19/423* (2014.11)

(58) Field of Classification Search
None
See application file for complete search history.

(56) References Cited

U.S. PATENT DOCUMENTS

2010/0208818 A1* 8/2010 Yin .................. H04N 19/13
375/E7.243
2021/0281870 A1 9/2021 Solovyev et al.

FOREIGN PATENT DOCUMENTS

WO 2020106190 A1 5/2020
WO 2023013667 A1 2/2023

OTHER PUBLICATIONS

International Search Report (ISR) (and an English language translation thereof) dated Oct. 18, 2022, issued in International Application No. PCT/JP2022/030193.

(Continued)

*Primary Examiner* — Christopher G Findley
(74) *Attorney, Agent, or Firm* — Holtz, Holtz & Volek PC

(57) ABSTRACT

An image decoding device includes a circuit which executes a first process that derives motion information for a geometric partitioning mode to generate a motion compensation sample, and a second process that derives an intra prediction mode for the geometric partitioning mode to generate an intra predicted sample. The first process determines that the motion information can be derived based on bi-prediction from an application area to which inter prediction is applied, in a case where a coding block is included in a B slice, intra prediction is applied to one partitioned area partitioned by the geometric partitioning mode applied to the coding block, and the inter prediction is applied to another partitioned area.

10 Claims, 27 Drawing Sheets

(51) Int. Cl.
*H04N 19/107* (2014.01)
*H04N 19/132* (2014.01)
*H04N 19/137* (2014.01)
*H04N 19/159* (2014.01)
*H04N 19/174* (2014.01)
*H04N 19/176* (2014.01)
*H04N 19/46* (2014.01)
*H04N 19/577* (2014.01)
*H04N 19/423* (2014.01)

(56) References Cited

OTHER PUBLICATIONS

"Versatile Video Coding," H266 ITU-T.
Written Opinion dated Oct. 18, 2022, issued in International Application No. PCT/JP2022/030193.
Blaser, et al., "Description of SDR and 360° video coding technology proposal by RWTH Aachen University", Joint Video Experts Team (JVET) of ITU-T SG 16 WP 3 and ISO/IEC JTC 1/SC 29/WG 11. JVET-J0023-vl. 10th Meeting: San Diego. US. Apr. 2018. pp. 1-14.
Chang, et al., "Compression efficiency methods beyond VVC", JVET-U0100.
Kidani, et al., "AHG 12: GPM with inter and intra prediction", Joint Video Experts Team (JVET) of ITU-T SG 16 WP 3 and ISO/IEC JTC 1/ SC 29. JVET-W0110-v2. 23rd Meeting. by teleconference. Jul. 2021. pp. 1-3.
Kidani, et al., "EE2-related: Combination of JVET-X0078 (Test 7/8). JVET-X0147 (Proposal-2). and GPM direct motion storage", Joint Video Experts Team (JVET) of ITU-T SG 16 WP 3 and ISO/IEC JTC 1/SC 29. JVET-X0166-v3. 24th Meeting. by teleconference. Oct. 2021. pp. 1-5.
Seregin, et al., "EE2: Summary Report on Enhanced Compression beyond VVC capability", JVET-W0024.
Yu, et al., "Modifications of motion storage in geometric partition mode", Joint Video Experts Team (JVET) of ITU-T SG 16 WP 3 and ISO/IEC JTC 1/SC 29/WG 11. JVET-R0213. 18th Meeting: by teleconference. Apr. 2020. pp. 1-5.
Japanese Office Action (and an English language translation thereof) dated Apr. 2, 2024, issued in counterpart Japanese Application No. 2021-157280.
Japanese Office Action (and an English language translation thereof) dated Apr. 15, 2025, issued in counterpart Japanese Application No. 2024-107771.
Chen, et al., "Algorithm Description of Joint Exploration Test Model 7 (JEM)", Joint Video Exploration Team, JVET-G1001-v1, 2017, pp. 23-28.
Liao, et al., "CE10.3.1.b: Triangular prediction unit mode", Joint Video Exploration Team, JVET-L0124-v1, 2018, pp. 1-6.
Japanese Office Action (and an English language translation thereof) dated Aug. 5, 2025, issued in counterpart Japanese Application No. 2024-107771.
Gao, et al., "CE4: CE4-1.1. CE4-1.2 and CE4-1.14: Geometric Merge Mode (GEO)", Joint Video Experts Team, JVET-P0068-v2, pp. 1-7, 2019.

* cited by examiner

FIG. 7

| MergeCandList [m, n] | L0 MV | L1 MV |
|---|---|---|
| 0 | x | |
| 1 | | x |
| 2 | x | |
| 3 | | x |
| 4 | x | |

FIG. 9

Table 1 – Specification of angleIdx and distanceIdx based on merge_gpm_partition_idx

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 18 | 18 | 18 | 18 | 19 | 19 | 19 | 20 | 20 | 20 | 20 |
| distanceIdx | 0 | 1 | 2 | 3 | 1 | 1 | 2 | 3 | 0 | 1 | 2 | 3 | 0 | 1 | 2 | 3 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

FIG. 10

Table 1 – Specification of the geometric
partitioning distance array disLut

| idx | 0 | 2 | 3 | 4 | 5 | 6 | 8 | 10 | 11 | 12 | 13 | 14 |
|---|---|---|---|---|---|---|---|---|---|---|---|---|
| disLut[ idx ] | 8 | 8 | 8 | 4 | 4 | 2 | 0 | -2 | -4 | -4 | -8 | -8 |
| idx | 16 | 18 | 19 | 20 | 21 | 22 | 24 | 26 | 27 | 28 | 29 | 30 |
| disLut[ idx ] | -8 | -8 | -8 | -4 | -4 | -2 | 0 | 2 | 4 | 4 | 8 | 8 |

FIG. 11

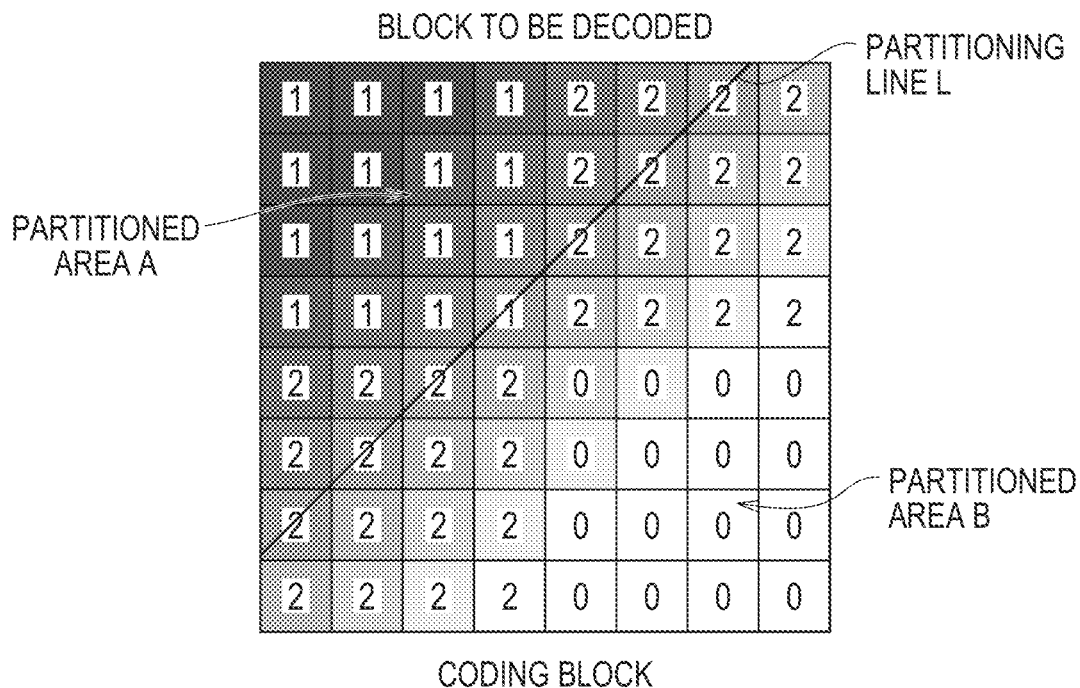

NON-PATENT LITERATURE 1
  STORED MOTION INFORMATION TYPE sType= 0~2
  0: STORE MOTION INFORMATION OF ONLY PARTITIONED AREA A
  1: STORE MOTION INFORMATION OF ONLY PARTITIONED AREA B
  2: MOTION INFORMATION OF BOTH PARTITIONED AREAS A AND B
  OR ONLY B PRESENT EMBODIMENT
    STORED PREDICTION INFORMATION TYPE sType= 0~2
    0: STORE PREDICTION INFORMATION OF ONLY PARTITIONED AREA A
    1: STORE PREDICTION INFORMATION OF ONLY PARTITIONED AREA B
    2: PREDICTION INFORMATION OF BOTH PARTITIONED AREAS A AND B
    OR ONLY B

FIG. 12

| STORED MOTION INFORMATION OR PREDICTION INFORMATION | NON-PATENT LITERATURE 1 | PRESENT EMBODIMENT |
|---|---|---|
| PREDICTION TYPE | | ○ |
| predFlagL0 | ○ | ○ |
| predFlagL1 | ○ | ○ |
| mvL0 | ○ | ○ |
| mvL1 | ○ | ○ |
| refIdxL0 | ○ | ○ |
| refIdxL1 | ○ | ○ |
| INTRA PREDICTION MODE | | ○ |
| BcwIdx | ○ | ○ |
| hpelIfIdx | | ○ (optional) |
| IBC_flag | | ○ (optional) |
| LIC_flag | | ○ (optional) |

FIG. 13

| sType && PREDICTION TYPE → ↓ STORED PREDICTION INFORMATION | 0 && Intra | 2 && (Intra + Inter) | 1 && Inter |
|---|---|---|---|
| PREDICTION TYPE | Intra | Inter | Inter |
| predFlagL0 | 1 or 0 | 1 | 1 or 0 |
| predFlagL1 | 0 or 1 | 1 | 0 or 1 |
| mvL0 | mvA or 0 | mvA or mvB | mvB or 0 |
| mvL1 | 0 or mvA | mvB or mvA | 0 or mvB |
| refIdxL0 | refIdxA or -1 | refIdxA or refIdxB | refIdxB or -1 |
| refIdxL1 | -1 or refIdxA | refIdxB or refIdxA | -1 or refIdxB |
| INTRA PREDICTION MODE | TO BE STORED | TO BE STORED | TO BE STORED |
| BcwIdx | VALUE INDICATING INVALIDITY | VALUE INDICATING INVALIDITY | VALUE INDICATING INVALIDITY |
| hpelIfIdx | VALUE INDICATING INVALIDITY | VALUE INDICATING INVALIDITY | VALUE INDICATING INVALIDITY |
| IBC_flag | VALUE INDICATING INVALIDITY | VALUE INDICATING INVALIDITY | VALUE INDICATING INVALIDITY |
| LIC_flag | VALUE INDICATING INVALIDITY | VALUE INDICATING INVALIDITY | VALUE INDICATING INVALIDITY |

FIG. 14

| sType && PREDICTION TYPE → <br> ↓STORED PREDICTION INFORMATION | 0 && Intra | 2 && (Intra + Inter) | 1 && Inter |
|---|---|---|---|
| PREDICTION TYPE | Intra | Inter | Inter |
| predFlagL0 | 0 | 1 or 0 | 1 or 0 |
| predFlagL1 | 0 | 0 or 1 | 0 or 1 |
| mvL0 | 0 | mvB or 0 | mvB or 0 |
| mvL1 | 0 | 0 or mvB | 0 or mvB |
| refIdxL0 | -1 | refIdxB or -1 | refIdxB or -1 |
| refIdxL1 | -1 | -1 or refIdxB | -1 or refIdxB |
| INTRA PREDICTION MODE | modeX | modeX | TO BE STORED |
| BcwIdx | VALUE INDICATING INVALIDITY | VALUE INDICATING INVALIDITY | VALUE INDICATING INVALIDITY |
| hpelIdx | VALUE INDICATING INVALIDITY | VALUE INDICATING INVALIDITY | VALUE INDICATING INVALIDITY |
| IBC_flag | VALUE INDICATING INVALIDITY | VALUE INDICATING INVALIDITY | VALUE INDICATING INVALIDITY |
| LIC_flag | VALUE INDICATING INVALIDITY | VALUE INDICATING INVALIDITY | VALUE INDICATING INVALIDITY |

FIG. 15

| sType && PREDICTION TYPE → <br> ↓ STORED PREDICTION INFORMATION | 0 && Intra | 2 && <br> (Intra + Inter) | 1 && Inter |
|---|---|---|---|
| PREDICTION TYPE | Intra | Inter | Inter |
| predFlagL0 | 0 | 1 | 1 |
| predFlagL1 | 0 | 1 | 1 |
| mvL0 | 0 | MVL0 | MVL0 |
| mvL1 | 0 | MVL1 | MVL1 |
| refIdxL0 | -1 | RefIdxL0 | RefIdxL0 |
| refIdxL1 | -1 | RefIdxL1 | RefIdxL1 |
| INTRA PREDICTION MODE | modeX | modeX or modeY | TO BE STORED |
| BcwIdx | VALUE INDICATING INVALIDITY | VALUE INDICATING INVALIDITY | VALUE INDICATING INVALIDITY |
| hpelIfIdx | VALUE INDICATING INVALIDITY | VALUE INDICATING INVALIDITY | VALUE INDICATING INVALIDITY |
| IBC_flag | VALUE INDICATING INVALIDITY | VALUE INDICATING INVALIDITY | VALUE INDICATING INVALIDITY |
| LIC_flag | VALUE INDICATING INVALIDITY | VALUE INDICATING INVALIDITY | VALUE INDICATING INVALIDITY |

FIG. 16

| sType && PREDICTION TYPE → STORED PREDICTION INFORMATION ↓ | 0 && Intra | 2 && (Intra + Inter) | 1 && Inter |
|---|---|---|---|
| PREDICTION TYPE | Intra | Intra | Intra |
| predFlagL0 | 0 | 0 | 0 |
| predFlagL1 | 0 | 0 | 0 |
| mvL0 | 0 | 0 | 0 |
| mvL1 | 0 | 0 | 0 |
| refIdxL0 | -1 | -1 | -1 |
| refIdxL1 | -1 | -1 | -1 |
| INTRA PREDICTION MODE | modeX | modeX or modeY | modeY |
| BcwIdx | VALUE INDICATING INVALIDITY | VALUE INDICATING INVALIDITY | VALUE INDICATING INVALIDITY |
| hpelIdx | VALUE INDICATING INVALIDITY | VALUE INDICATING INVALIDITY | VALUE INDICATING INVALIDITY |
| IBC_flag | VALUE INDICATING INVALIDITY | VALUE INDICATING INVALIDITY | VALUE INDICATING INVALIDITY |
| LIC_flag | VALUE INDICATING INVALIDITY | VALUE INDICATING INVALIDITY | VALUE INDICATING INVALIDITY | ent in the buffer.

IMAGE DECODING DEVICE, IMAGE DECODING METHOD, AND PROGRAM

CROSS-REFERENCE TO RELATED APPLICATIONS

The present application is a continuation of PCT Application No. PCT/JP2022/030193, filed on Aug. 5, 2022, which claims the benefit of Japanese patent application No. 2021-157280 filed on Sep. 27, 2021, the entire contents of which are incorporated herein by reference in its entirety.

TECHNICAL FIELD

The present invention relates to an image decoding device, an image decoding method, and a program.

BACKGROUND ART

Non Patent Literature 1 discloses a geometric partitioning mode (GPM).

The GPM diagonally divides a rectangular block into two and performs motion compensation on each of the two blocks. Specifically, in the GPM, each of the two partitioned areas is motion-compensated by a motion vector in a merge mode, and is blended by weighted averaging. As the oblique partitioning pattern, sixty-four patterns are prepared according to the angle and the displacement.

CITATION LIST

Non Patent Literature

Non Patent Literature 1: ITU-T H.266/VVC
Non-Patent Literature 2: JVET-W0024, "EE2: Summary Report on Enhanced Compression beyond VVC capability"
Non-Patent Literature 3: JVET-U0100, "Compression efficiency methods beyond VVC"

SUMMARY OF THE INVENTION

However, since the GPM disclosed in Non Patent Literature 1 is limited to the merge mode, there is a problem that there is room for improvement in coding performance.

Therefore, the present invention has been made in view of the above-described problems, and an object of the present invention is to provide an image decoding device, an image decoding method, and a program capable of improving prediction performance of an inter prediction area and improving coding performance by applying bi-prediction to the inter prediction area of GPM configured by intra prediction and inter prediction in a case where an intra prediction mode is added in GPM.

The first aspect of the present invention is summarized as an image decoding device including a circuit and a buffer, wherein the circuit executes: a first process that derives motion information for a geometric partitioning mode to generate a motion compensation sample; and a second process that derives an intra prediction mode for the geometric partitioning mode to generate an intra predicted sample, the buffer that stores or outputs prediction information including motion information or an intra prediction mode of a coding block to which the geometric partitioning mode is applied, and a prediction type capable of determining whether inter prediction or intra prediction is applied, the first process: controls whether or not to derive motion information by bi-prediction on a basis of a predetermined condition, generates the motion compensation sample using the derived motion information, and stores the motion information in the buffer.

The second aspect of the present invention is summarized as an image decoding method including: deriving motion information for a geometric partitioning mode to generate a motion compensation sample; deriving an intra prediction mode for the geometric partitioning mode to generate an intra predicted sample; and storing or outputting prediction information including motion information or an intra prediction mode of a coding block to which the geometric partitioning mode is applied, and a prediction type capable of determining whether inter prediction or intra prediction is applied, wherein the deriving the motion information includes: controlling whether or not to derive motion information by bi-prediction on a basis of a predetermined condition, generating the motion compensation sample using the derived motion information, and storing the motion information in the buffer.

The third aspect of the present invention is summarized as a program stored on a non-transitory computer-readable medium for causing a computer to function as an image decoding device, the image decoding device including a circuit and a buffe, wherein a first process derives motion information for a geometric partitioning mode to generate a motion compensation sample; a second process derives an intra prediction mode for the geometric partitioning mode to generate an intra predicted sample; and the buffer stores or outputs prediction information including motion information or an intra prediction mode of a coding block to which the geometric partitioning mode is applied, and a prediction type capable of determining whether inter prediction or intra prediction is applied, wherein the first process: controls whether or not to derive motion information by bi-prediction on a basis of a predetermined condition, generates the motion compensation sample using the derived motion information, and store the motion information in the buffer.

According to the present invention, it is possible to provide an image decoding device, an image decoding method, and a program capable of improving prediction performance of an inter prediction area and improving coding performance by applying bi-prediction to the inter prediction area of GPM configured by intra prediction and inter prediction in a case where an intra prediction mode is added in GPM.

BRIEF DESCRIPTION OF THE DRAWINGS

FIG. 7 is a diagram illustrating a method for building a merge candidate list disclosed in Non-Patent Literature 1.

FIG. 9 is a diagram illustrating an example of angleIdx that defines an angle of a partition line of the GPM.

FIG. 10 is a diagram illustrating an example of disLut.

FIG. 11 is a diagram illustrating an example in which a stored prediction information type disclosed in Non-Patent Literature 1 and a stored prediction information type according to the present embodiment are specified for each 4×4 sample sub-block.

FIG. 12 is a diagram illustrating a list of motion information disclosed in Non-Patent Literature 1 and prediction information according to the present embodiment, which are stored according to a value of sType of sub-blocks configuring a GPM-applied block.

FIG. 13 is a diagram illustrating an example of prediction information stored in the GPM including two different inter predictions as illustrated in FIG. 4.

FIG. 14 is a diagram illustrating an example of the prediction information stored for a GPM including the intra prediction and the inter prediction in FIG. 5.

FIG. 15 is a diagram illustrating an example of the prediction information stored for the GPM including two different intra predictions as illustrated in FIG. 6.

FIG. 16 is a diagram illustrating an example of the prediction information stored for the GPM including two different intra predictions as illustrated in FIG. 7.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
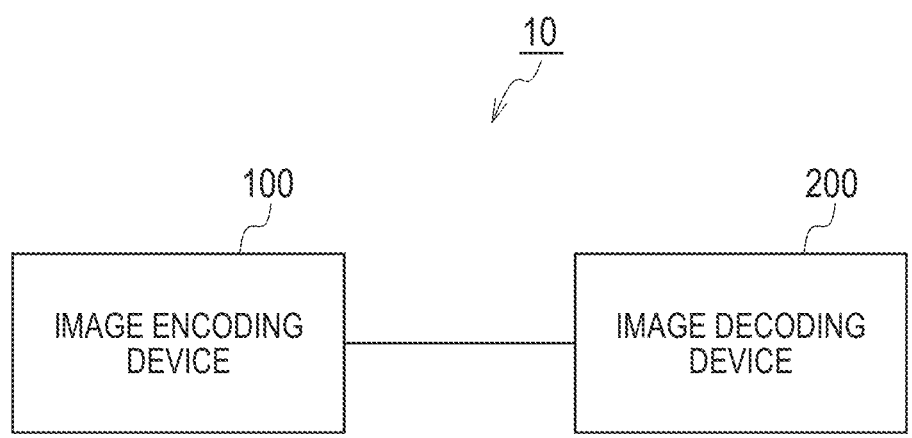
FIG. 1 is a diagram illustrating an example of a configuration of an image processing system 1 according to an embodiment.

Hereinafter, an image processing system 10 according to a first embodiment of the present invention will be described with reference to FIGS. 1 to 26. FIG. 1 is a diagram illustrating the image processing system 10 according to the present embodiment.

(Image Processing System 10)

As illustrated in FIG. 1, the image processing system 10 according to the present embodiment includes an image coding device 100 and an image decoding device 200.

The image coding device 100 is configured to generate coded data by coding an input image signal (picture). The image decoding device 200 is configured to generate an output image signal by decoding the coded data.

The coded data may be transmitted from the image coding device 100 to the image decoding device 200 via a transmission path. The coded data may be stored in a storage medium and then provided from the image coding device 100 to the image decoding device 200.

(Image Coding Device 100)

Figure 2:
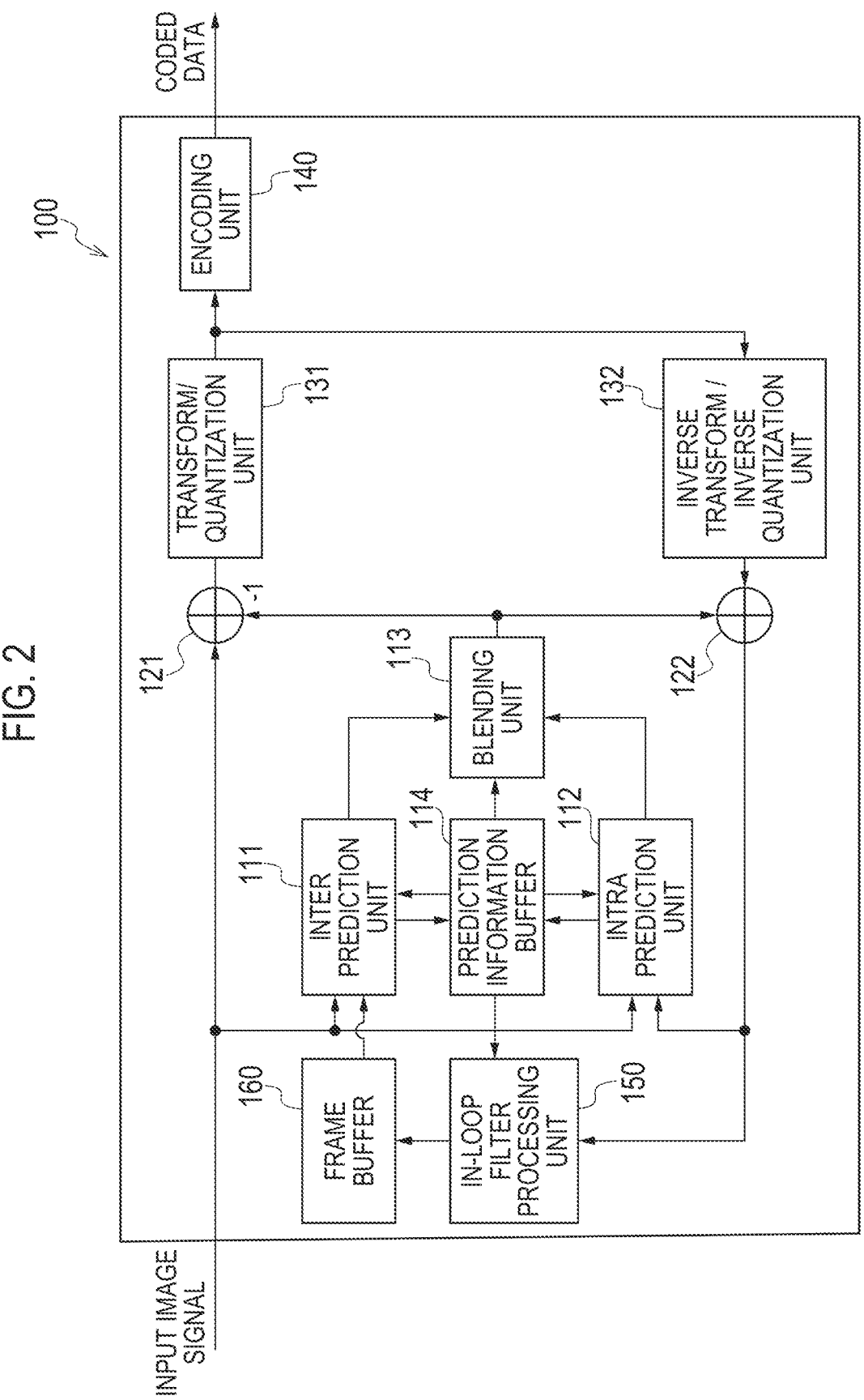
FIG. 2 is a diagram illustrating an example of functional blocks of an image encoding device 100 according to an embodiment.

Hereinafter, the image coding device 100 according to the present embodiment will be described with reference to FIG. 2. FIG. 2 is a diagram illustrating an example of functional blocks of the image coding device 100 according to the present embodiment.

As shown in FIG. 2, the image coding device 100 includes an inter prediction unit 111, an intra prediction unit 112, a blending unit 113, a prediction information buffer 114, a subtractor 121, an adder 122, a transform/quantization unit 131, an inverse transform/inverse quantization unit 132, an encoding unit 140, an in-loop filtering processing unit 150, and a frame buffer 160.

The inter prediction unit 111 is configured to generate a prediction signal by inter prediction (inter-frame prediction).

Specifically, the inter prediction unit 111 is configured to specify a reference block included in a reference frame by comparing a frame to be coded (hereinafter, referred to as a current frame) with the reference frame stored in the frame buffer 160, and determine a motion vector (mv) for the specified reference block. Here, the reference frame is a frame different from the current frame.

The inter prediction unit 111 is configured to generate the prediction signal included in a block to be coded (hereinafter, referred to as a target block) for each target block based on the reference block and the motion vector.

The inter prediction unit 111 is configured to output the inter prediction signal to the blending unit 113.

Although not illustrated in FIG. 2, the inter prediction unit 111 is configured to output information related to inter prediction control (specifically, information such as an inter prediction mode, a motion vector, a reference frame list, and a reference frame number) to the encoding unit 140.

The intra prediction unit 112 is configured to generate a prediction signal by intra prediction (intra-frame prediction).

Specifically, the intra prediction unit 112 is configured to specify the reference block included in the current frame, and generate the prediction signal for each target block based on the specified reference block. Here, the reference block is a block referred to for the target block. For example, the reference block is a block adjacent to the target block.

Furthermore, the intra prediction unit 112 is configured to output the intra prediction signal to the blending unit 113.

Furthermore, although not illustrated in FIG. 2, the intra prediction unit 112 is configured to output information (specifically, information such as an intra prediction mode) regarding control of intra prediction to the encoding unit 140.

The blending unit 113 is configured to blend the inter prediction signal input from the inter prediction unit 111 and/or the intra prediction signal input from the intra prediction unit 112 using a preset weighting factor, and output the blended prediction signal (hereinafter, collectively referred to as a prediction signal) to the subtractor 121 and the adder 122.

The prediction information buffer 114 is configured to store prediction information input from the inter prediction unit 111 or the intra prediction unit 112, or output the stored prediction information to the inter prediction unit 111, the intra prediction unit 112, the blending unit 113, or the in-loop filter processing unit 150. Here, details of the prediction information will be described later.

Here, regarding the blending processing of the inter prediction signal and/or the intra prediction signal by the blending unit 113, the same configuration as that of Non Patent Literature 1 can be adopted in the present embodiment, and thus the description thereof will be omitted.

The subtractor 121 is configured to subtract the prediction signal from the input image signal, and output a prediction residual signal to the transform/quantization unit 131. Here, the subtractor 121 is configured to generate the prediction residual signal that is a difference between the prediction signal generated by intra prediction or inter prediction and the input image signal.

The adder 122 is configured to add the prediction signal output from the blending unit 113 to the prediction residual signal output from the inverse transform/inverse quantization unit 132 to generate a decoded signal before filtering, and output the decoded signal before filtering to the intra prediction unit 112 and the in-loop filter processing unit 150.

Here, the pre-filtering decoded signal constitutes the reference block used by the intra prediction unit 112.

The transform/quantization unit 131 is configured to perform transform processing for the prediction residual signal and acquire a coefficient level value. Furthermore, the transform/quantization unit 131 may be configured to perform quantization of the coefficient level value.

Here, the transform processing is transforming the prediction residual signal into a frequency component signal. In such transform processing, a kernel pattern (transformation matrix) corresponding to discrete cosine transform (Hereinafter referred to as DCT) may be used, or a kernel pattern (transformation matrix) corresponding to discrete sine transform (Hereinafter referred to as DST) may be used.

Furthermore, as the transform processing, multiple transform selection (MTS) that enables selection of a transform kernel suitable for deviation of the coefficient of the prediction residual signal from the plurality of transform kernels disclosed in Non Patent Literature 1 for each of the horizontal and vertical directions, or low frequency-non-separable transform (LFNST) that improves the coding performance by further concentrating the transform coefficient after the primary transform in the low frequency region may be used.

The inverse transform/inverse quantization unit 132 is configured to perform inverse transform processing for the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The encoding unit 140 is configured to code the coefficient level value output from the transform/quantization unit 131 and output coded data.

Here, for example, the coding is entropy coding in which codes of different lengths are assigned based on a probability of occurrence of the coefficient level value.

Furthermore, the encoding unit 140 is configured to code control data used in decoding processing in addition to the coefficient level value.

Here, the control data may include information related to the block size (flag and index) such as a coding block size, a prediction block size, and a transform block size.

Furthermore, the control data may include information (flag and index) necessary for control of the inverse transform/inverse quantization processing of the inverse transform/inverse quantization unit 220, the inter prediction signal generation processing of the inter prediction unit 241, the intra prediction signal generation processing of the intra prediction unit 242, the blending processing of the inter prediction signal or/and the intra prediction signal of the blending unit 243, the filter processing of the in-loop filter processing unit 250, and the like in the image decoding device 200 described later.

Note that, in Non Patent Literature 1, these pieces of control data are referred to as syntaxes, and the definition thereof is referred to as semantics.

Furthermore, the control data may include header information such as a sequence parameter set (SPS), a picture parameter set (PPS), and a slice header as described later.

The in-loop filtering processing unit 150 is configured to execute filtering processing on the pre-filtering decoded signal output from the adder 122 and output the filtered decoded signal to the frame buffer 160.

Herein, for example, the filter processing is deblocking filter processing, which reduces the distortion generated at boundary parts of blocks (coding blocks, prediction blocks, or transform blocks), or adaptive loop filter processing, which switches filters based on filter coefficients, filter selection information, local properties of picture patterns of an image, etc. transmitted from the image encoding device 100.

The frame buffer 160 is configured to accumulate the reference frames used by the inter prediction unit 111.

Here, the filtered decoded signal constitutes the reference frame used by the inter prediction unit 111.

(Image Decoding Device 200)

Figure 3:
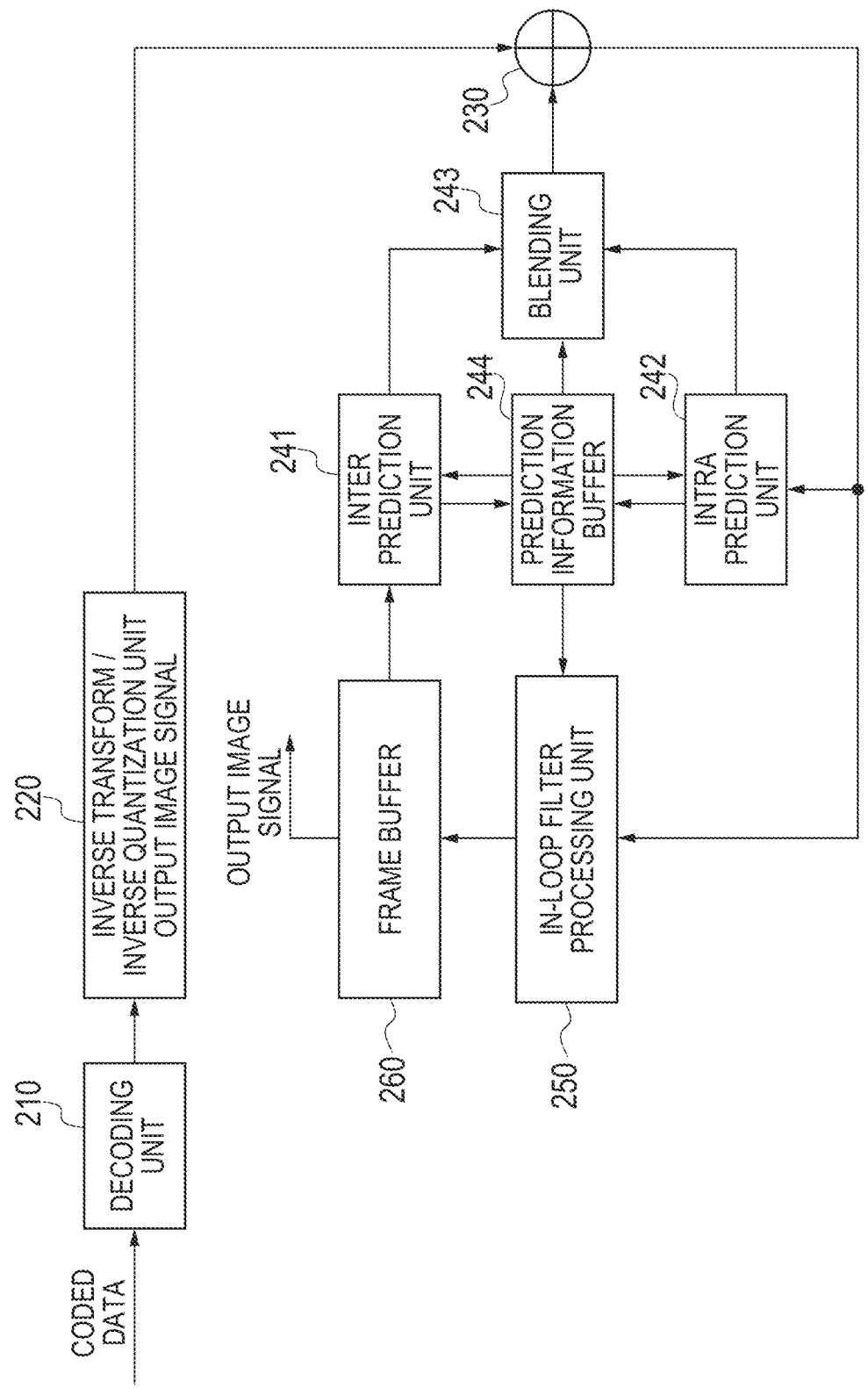
FIG. 3 is a diagram illustrating an example of functional blocks of an image decoding device 200 according to an embodiment.

Hereinafter, the image decoding device 200 according to the present embodiment will be described with reference to FIG. 3. FIG. 3 is a diagram illustrating an example of functional blocks of the image decoding device 200 according to the present embodiment.

As illustrated in FIG. 3, the image decoding device 200 includes a decoding unit 210, an inverse transform/inverse quantization unit 220, an adder 230, an inter prediction unit 241, an intra prediction unit 242, a blending unit 243, a prediction information buffer 224, an in-loop filtering processing unit 250, and a frame buffer 260.

The decoding unit 210 is configured to decode the coded data generated by the image coding device 100 and decode the coefficient level value.

Here, the decoding is, for example, entropy decoding performed in a reverse procedure to the entropy coding performed by the encoding unit 140.

Furthermore, the decoding unit 210 may be configured to acquire control data by decoding processing for the coded data.

Here, the control data may include information related to the block size of the decoded block (synonymous with a block to be encoded in the above-described image encoding device 100, hereinafter, collectively referred to as a target block) described above.

Furthermore, the control data may include information (flag or index) necessary for control of the inverse transform/inverse quantization processing of the inverse transform/inverse quantization unit 220, the predicted sample generation processing of the inter prediction unit 241 or the intra prediction unit 242, the filter processing of the in-loop filter processing unit 250, and the like.

Furthermore, the control data may include header information such as a sequence parameter set (SPS), a picture parameter set (PPS), a picture header (PH), or a slice header (SH) described above.

The inverse transform/inverse quantization unit 220 is configured to perform inverse transform processing for the coefficient level value output from the decoding unit 210. Here, the inverse transform/inverse quantization unit 220 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

Similarly to the inter prediction unit 111, the inter prediction unit 241 is configured to generate a prediction signal by inter prediction (inter-frame prediction).

Specifically, the inter prediction unit 241 is configured to generate the prediction signal for each prediction block based on the motion vector decoded from the coded data and the reference signal included in the reference frame. The inter prediction unit 241 is configured to output the prediction signal to the blending unit 243.

Similarly to the intra prediction unit 112, the intra prediction unit 242 is configured to generate a prediction signal by intra prediction (intra-frame prediction).

Specifically, the intra prediction unit 242 is configured to specify the reference block included in the current frame, and generate the prediction signal for each prediction block based on the specified reference block. The intra prediction unit 242 is configured to output the prediction signal to the blending unit 243.

Like the blending unit 113, the blending unit 243 is configured to blend the inter prediction signal input from the inter prediction unit 241 and/or the intra prediction signal input from the intra prediction unit 242 using a preset weighting factor, and output the blended prediction signal (hereinafter, collectively referred to as a prediction signal) to the adder 230.

Similarly to the prediction information buffer 114, the prediction information buffer 244 is configured to store prediction information input from the inter prediction unit 221 or the intra prediction unit 222, or output the stored prediction information to the inter prediction unit 241, the intra prediction unit 242, the blending unit 243, or the in-loop filter processing unit 250. Here, details of the prediction information will be described later.

The adder 230 is configured to add the prediction signal output from the blending unit 243 to the prediction residual signal output from the inverse transform/inverse quantization unit 220 to generate a pre-filtering decoded signal, and output the pre-filtering decoded signal to the in-loop filtering processing unit 250.

Here, the decoded signal before filtering configures a reference block used by the intra prediction unit 242.

Similarly to the in-loop filtering processing unit 150, the in-loop filtering processing unit 250 is configured to execute filtering processing on the pre-filtering decoded signal output from the adder 230 and output the filtered decoded signal to the frame buffer 260.

Herein, for example, the filter processing is deblocking filter processing, which reduces the distortion generated at boundary parts of blocks (coding blocks, prediction blocks, transform blocks, or sub-blocks obtained by dividing them), or adaptive loop filter processing, which switches filters based on filter coefficients, filter selection information, local properties of picture patterns of an image, etc. transmitted from the image encoding device 100.

Similarly to the frame buffer 160, the frame buffer 260 is configured to accumulate the reference frames used by the inter prediction unit 241.

Here, the filtered decoded signal constitutes the reference frame used by the inter prediction unit 241.

(Geometric Partitioning Mode)

Hereinafter, with reference to FIG. 4, the geometric partitioning mode (GPM) disclosed in Non Patent Literature 1 related to the decoding unit 210, the inter prediction unit 241, and the intra prediction unit 242 will be described.

Figure 4:
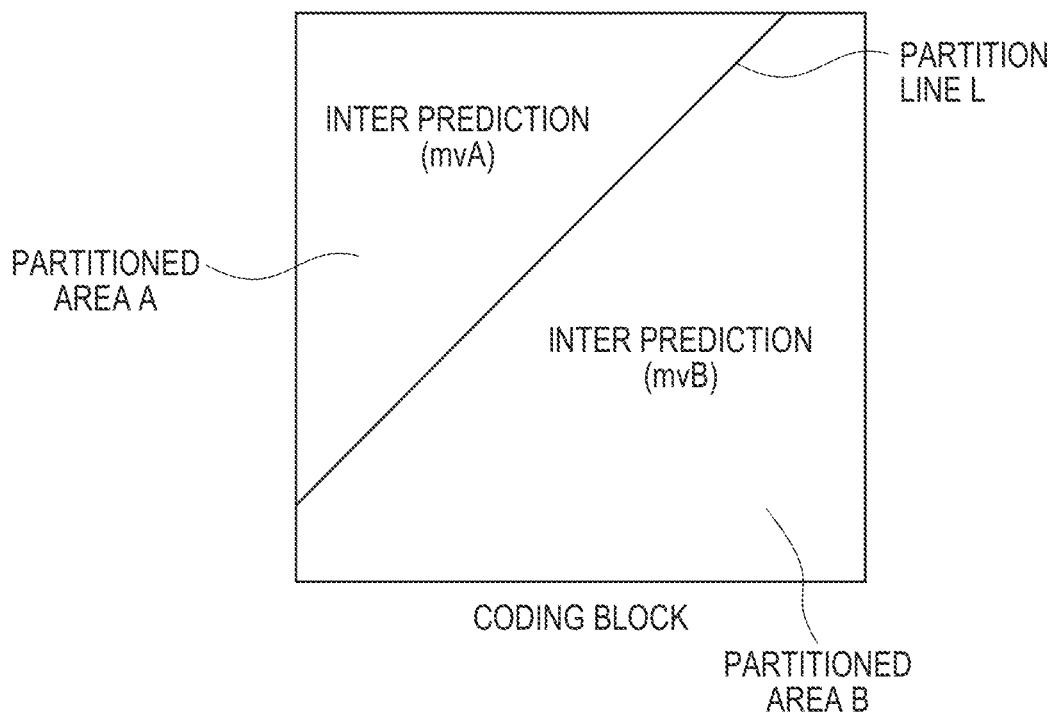
FIG. 4 is a diagram illustrating an example of a case where a rectangular coding block is partitioned into two areas of a partitioned area A and a partitioned area B of a geometric shape by a partition line of a geometric partitioning mode according to the geometric partitioning mode disclosed in Non-Patent Literature 1.

FIG. 4 illustrates an example of a case where a rectangular coding block is partitioned into two regions of partitioned area A and partitioned area B of a geometric shape by a partitioning line L1 of the geometric partitioning mode according to the geometric partitioning mode disclosed in Non Patent Literature 1.

Here, sixty-four patterns of the partitioning line L1 of the geometric partitioning mode disclosed in Non Patent Literature 1 are prepared according to the angle and the displacement.

Furthermore, the GPM according to Non Patent Literature 1 applies a normal merge mode, which is a type of inter prediction, to each of the partitioned area A and the partitioned area B to generate an inter predicted (motion-compensated) sample.

Specifically, in such a GPM, a merge candidate list disclosed in Non-Patent Literature 1 is built, a motion vector (mvA, mvB) and a reference frame of each partitioned area A/B are derived on the basis of the merge candidate list and two merge indexes (merge_gpm_idx0, merge_gpm_idx1) for each partitioned area A/B transmitted from the image encoding device 100, and a reference block, that is, an inter prediction (or motion compensation) block is generated. Finally, the inter prediction samples of each partitioned area A/B are weighted and averaged by a preset weight and blended.

(Application of Intra Prediction to GPM)

Hereinafter, application of the decoding unit 210, the inter prediction unit 241, and the intra prediction unit 242 to the geometric partitioning mode (GPM) disclosed in Non-Patent Literature 1 and the first geometric partitioning mode (GPM) according to the present embodiment will be described with reference to FIGS. 5 and 6.

Figure 5:
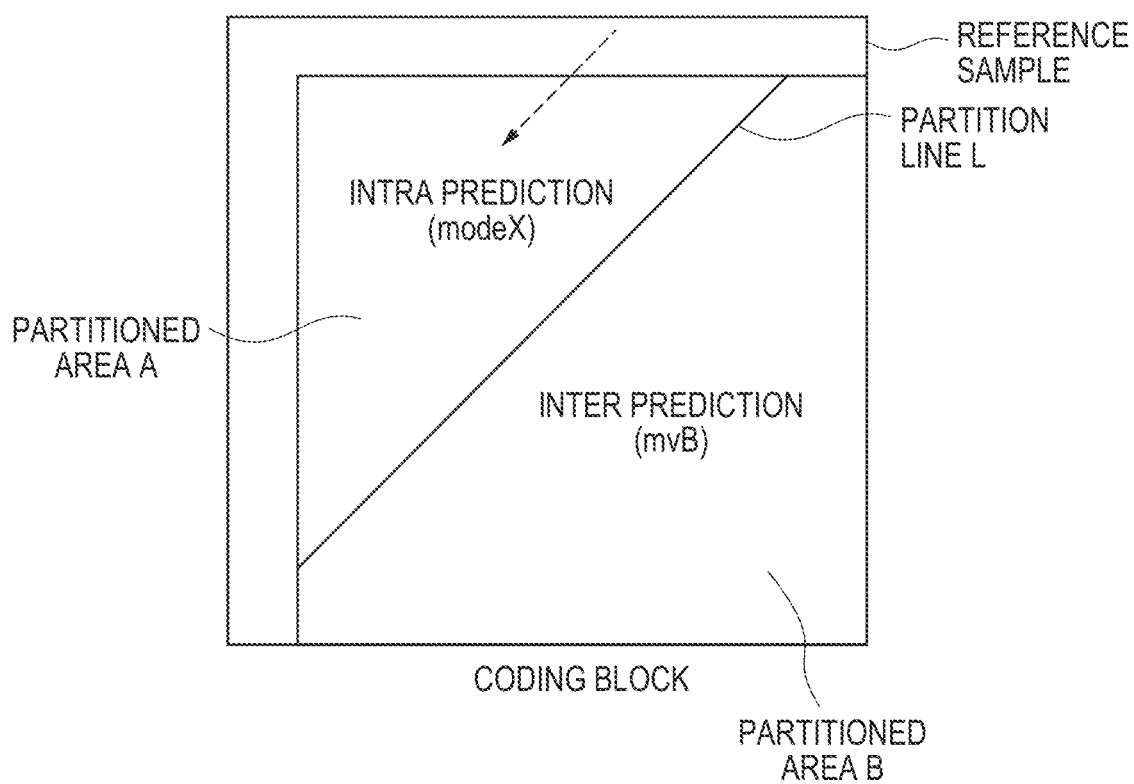
FIG. 5 illustrates an example of application of an intra prediction mode to a GPM according to the present embodiment.
Figure 6:
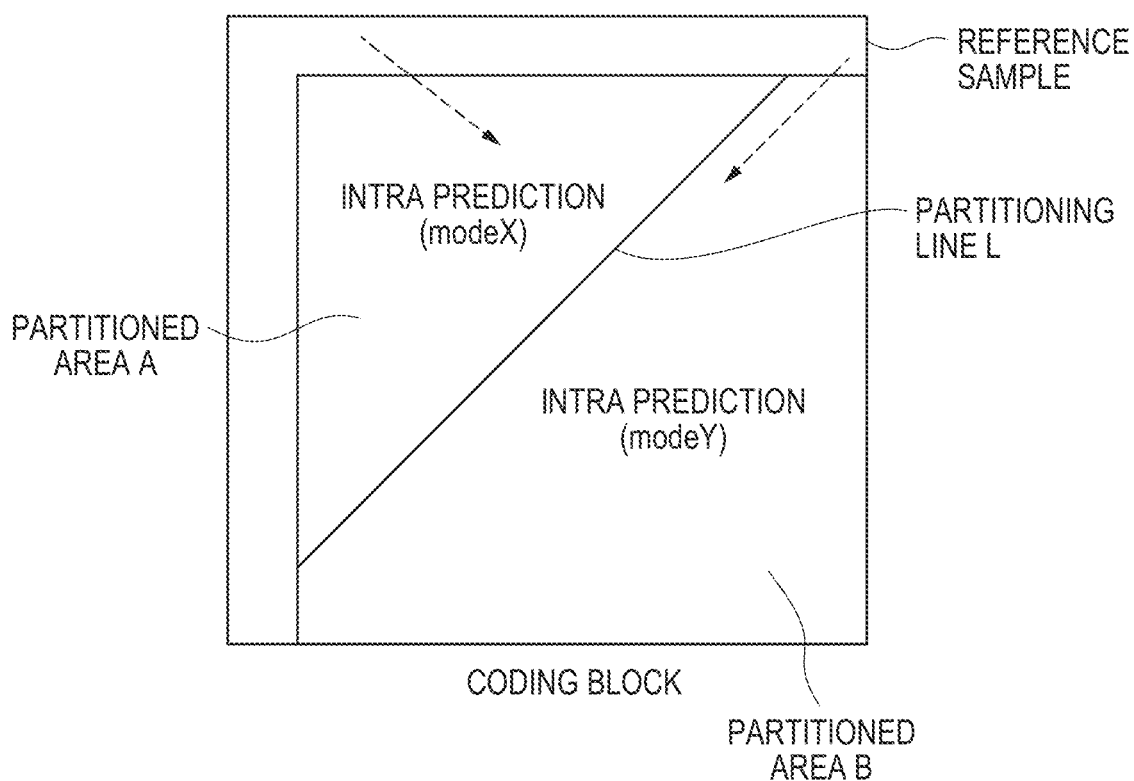
FIG. 6 illustrates an example of application of an intra prediction mode to the GPM according to the present embodiment.

FIGS. 5 and 6 illustrate an example of application of the intra prediction mode to the GPM according to the present embodiment.

Specifically, FIG. 5 illustrates a configuration example of the GPM in a case where the intra prediction (modeX) and the inter prediction are applied to each partitioned area A/B according to the present embodiment. FIG. 6 illustrates a configuration example of the GPM in a case where two different intra predictions (modeX, modeY) are applied to A/B of each partitioned area according to the present embodiment.

Here, in the first GPM according to the present embodiment, either the inter prediction mode or the intra prediction mode can be applied to each partitioned area A/B, and the type of the intra prediction mode is limited according to the partition shape (partition line) of the target block.

Furthermore, in the second GPM according to the present embodiment, a method of specifying the application possibility of the GPM to which the intra prediction mode is additionally applied in the coding block and the prediction mode type in each of the partitioned areas A/B when the GPM is applied is defined.

Consequently, the GPM to which the intra prediction mode is additionally applied is appropriately applied to the coding block, and the optimum prediction mode is specified, as a result of which the coding performance can be further improved.

Note that, hereinafter, GPMs configured by two different inter predictions as illustrated in FIG. 4, GPMs configured by intra prediction and inter prediction as illustrated in FIG. 5, and GPMs configured by two intra predictions as illustrated in FIG. 6 are referred to as Inter/Inter-GPM, Intra/Inter-GPM, and Intra/Intra-GPM, respectively.

Furthermore, in the present embodiment, a method of applying the bi-prediction to inter prediction of the Intra/Inter-GPM included in the B slice is defined.

Here, a B slice is a slice in which application of bi-prediction to the inter-prediction block is not limited. On the other hand, a P slice is a slice in which the application of the bi-prediction to the inter-prediction block is limited (prohibited), that is, only one-sided prediction can be applied to the inter-prediction block. Here, the one-sided prediction is an inter prediction (motion compensation) in which an inter prediction (motion compensation) sample is generated by only one motion vector.

This improves the prediction performance of the inter prediction application area in the GPM, as a result of which, a room for further improvement in the coding performance can be realized.

Hereinafter, a method of applying the bi-prediction to the Intra/Inter-GPM among application patterns of the intra-prediction to the GPM proposed in the present embodiment will be described from three viewpoints.

Here, the three viewpoints are a motion information deriving method at the time of applying the bi-prediction to the Intra/Inter-GPM in the inter prediction unit 241, a prediction information storing method in the inter prediction unit 241, the intra prediction unit 242, and the prediction information buffer 244, and a predicted sample generating method in the inter prediction unit 241, the intra prediction unit 242, and the blending unit 243.

[Motion Information Deriving Method During Bi-Prediction Application in Inter Prediction Unit]

(Merge Candidate List)

Figure 7:
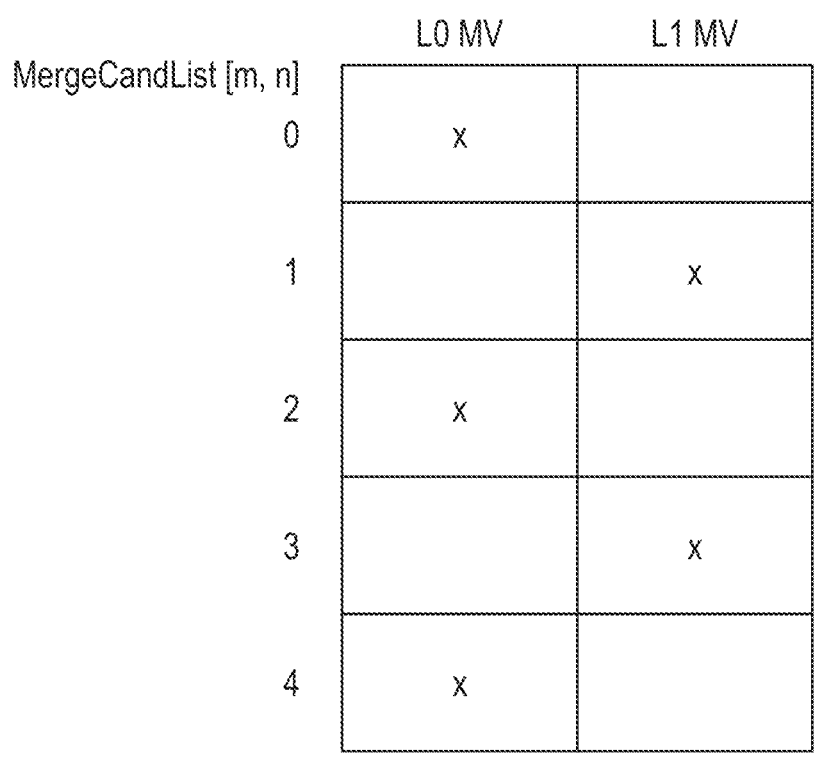

FIG. 7 is a diagram illustrating a method of building a merge candidate list disclosed in Non-Patent Literature 1.

As illustrated in FIG. 7, such a merge candidate list includes a list 0 (L0) and a list 1 (L1) indicating two prediction directions, and lists a plurality of motion information candidates to be described later for each list.

First, the motion information in the normal merge mode disclosed in Non-Patent Literature 1 is derived by merge_idx. Specifically, the motion information of the merge candidate list corresponding to the list number indicated by merge_idx is determined as the motion information in the normal merge mode.

Here, the motion information used in the normal merge mode may be bi-prediction (two motion vectors, that is, one motion vector may be included in each list of L0 and L1), unlike the motion information selected by each of two merge indexes of the GPM to be described later.

Note that, in Non-Patent Literature 1, at the time of constructing the merge candidate list for normal merge, pruning processing for avoiding storage of the same motion vector in the merge candidate list is introduced.

In the pruning processing of Non-Patent Literature 1, when the motion information is added as a new merge candidate in the merge candidate list in the order of spatial merge, temporal merge, history merge, pairwise average merge, and zero merge disclosed in Non-Patent Literature 1, it is determined whether or not to perform pruning by comparing matching of a reference frame and a motion vector included in a merge candidate already stored in the merge candidate list.

Specifically, whether or not the reference frames completely match is first compared, and if the reference frames completely match, whether or not the motion vectors completely match is then determined.

If the reference frames do not exactly match, even if the motion vectors match, the comparison target is not considered to be pruned. In this case, among the comparison targets, the motion information that is not in the merge candidate list is configured to be added to the merge candidate list as a new merge candidate.

Second, if the reference frames perfectly match and the motion vectors perfectly match, the comparison target is considered to be pruned. In other cases, among the comparison targets, motion information that is not in the merge candidate list is configured to be added to the merge candidate list as a new merge candidate.

Note that, in a case where the motion information is bi-predicted, that is, in a case where the motion information has one motion vector and one reference frame for each of L0 and L1, the motion information is regarded as a pruning target in a case where the motion information completely matches the motion vector and the reference frame for each of L0 and L1 as the merge candidates to be compared.

For the bi-prediction applied to the Intra/Inter-GPM inter prediction proposed in the present embodiment, the inter prediction unit 241 may derive the motion information from the merge candidate list for the normal merge mode.

This is because application of bi-prediction is limited (prohibited) in each inter prediction area of the Intra/Inter-GPM disclosed in Non-Patent Literature 1, and thus, a merge candidate list for the GPM to be described later is used to derive the motion information for each inter prediction area, but in the present embodiment, application of bi-prediction is not limited (prohibited) in the inter prediction area, thereby making it possible to use a merge candidate list for a normal merge mode as it is.

In the case that the merge candidate list for the normal merge mode is used, in the case where the motion information of the merge candidate list corresponding to the list number indicated by the merge index merge_idx is the one-sided prediction, (that is, either L0 or L1 is a zero vector), the inter prediction unit 241 may derive the motion information as the one-sided prediction instead of the bi-prediction in the inter prediction area of Intra/Inter-GPM to generate the prediction sample.

Here, as a modification of the present embodiment, the motion information may be derived from the merge candidate list for the GPM disclosed in Non-Patent Literature 1.

Specifically, in Non-Patent Literature 1, motion information of the inter prediction for a partitioned area A/B of the Inter/Inter-GPM is derived by values of two merge indexes (merge_gpm_idx0/merge_gpm_idx1) decoded or inferred by the decoding unit 210 and a merge candidate list (MergeCandList [m, n]) for the GPM illustrated in FIG. 5.

Here, in order to prevent the pieces of motion information derived based on merge_gpm_idx0 and merge_gpm_idx1 from overlapping as much as possible, the list number from which the motion information selected by merge_gpm_idx0 and merge_gpm_idx1 is derived has a nested structure with an even number and an odd number of MergeCandList as illustrated in X of FIG. 5.

Specifically, the following m and n are calculated on the basis of merge_gpm_idx0 and merge_gpm_idx1.

m=merge_gpm_idx0[xCb][yCb]
n=merge_gpm_idx1[xCb][yCb]+((merge_gpm_idx1 [xCb][yCb]>=m)?1:0)

Based on the value of m calculated in this manner, the motion vector, the reference frame index, and the prediction list flag configuring the motion information of the partitioned area A are derived as follows.

First, the value of X is calculated from m & 0x01 (determination of whether the value of m is an even number) and n & 0x01 (determination of whether the value of n is an even number). Here, when the calculated X is 0, the value of X is set to (1−X).

Finally, the motion vector mvA of the partitioned area A, the reference frame index refIdxA, the prediction list flag preListFlagA, the motion vector mvB of the partitioned area B, the reference frame index refIdxB, and the prediction list flag preListFlagB are derived as follows.

mvA=mvLXM
refIdxA=refIdxLXM
preListFlagA=X
mvB=mvLXN
refIdxB=refIdxLXN
preListFlagB=X Here, M and N are numbers of merge candidates indicated by m and n in the merge candidate list, respectively, that is, M=MergeCandList [m]
N=MergeCandList [n].

However, in the present embodiment, application of bi-prediction in a case where only one of the partitioned areas A/B is an inter prediction is proposed. Therefore, as described above, decoding of two merge indexes is unnecessary, and a motion vector can be derived by only one merge index.

Here, deriving the motion vector using one merge index from the merge candidate list for the GPM disclosed in Non-Patent Literature 1 is substantially the same as deriving the motion vector using one merge index from the merge candidate list for the normal merge mode.

Here, in contrast to the merge candidate list for the GPM disclosed in Non-Patent Literature 1, the merge candidate list for the GPM disclosed in Non-Patent Literature 2 introduces pruning processing (hereinafter, pruning processing for GPM) stronger than the pruning processing (hereinafter referred to as "pruning processing for the normal merge") introduced in the above-described merge candidate list for the normal merge disclosed in Non-Patent Literature 1.

Specifically, in the pruning processing for the GPM, unlike the pruning processing for the normal merge disclosed in Non-Patent Literature 1, the determination as to whether or not the motion information is to be selected as a target to be pruned is made based on whether or not the reference frames included in the motion information completely match as in Non-Patent Literature 1, but the motion vector included in the motion information is not completely matched but is determined based on a threshold based on a block size of the coding block.

Specifically, in a case where the block size to be decoded is less than 64 samples, the threshold is set to ¼ samples. In a case where the block size to be decoded is 64 samples or more and less than 256 samples, the threshold is set to ½ samples. In a case where the block size to be decoded is 256 samples or more, the threshold is set to 1 sample.

In a specific flow of the pruning processing for the GPMs, as with the pruning processing for the normal merge, first, reference frames are compared for exact match, and if the reference frames are exact match, second, it is determined whether the motion vectors are exact match.

If the reference frames do not exactly match, even if the motion vectors are below a threshold, the target is not considered to be pruned. In this case, the motion information that is not included in the merge candidate list among the comparison targets is added to the merge candidate list as a new merge candidate.

Third, in a case where the reference frames are exactly matched and the motion vector is less than the threshold, the target is considered to be pruned. In other cases, the motion information that is not in the merge candidate list among the comparison targets is added to the merge candidate list as a new merge candidate.

As a result, since the motion information in the case where the motion vectors that are not to be pruned in the pruning processing for the normal merge are similar to each other is also included in the pruning target, the similarity of the motion information derived by the two merge indexes of the GPM can be eliminated, and an improvement of the coding performance can be expected.

In the GPM pruning processing disclosed in Non-Patent Literature 2, in a case where the motion information is bi-predicted, that is, the motion information has one motion vector and one reference frame for each of L0 and L1, the motion information is regarded as a target to be pruned in a case where the motion information completely matches each of the reference frames of L0 and L1 as merge candidates to be compared.

In the present embodiment, the inter prediction unit 241 may derive the motion information by using the merge candidate list of the GPMs to which the pruning processing for the GPMs is added as an alternative for the normal merge mode.

Consequently, the motion information can be derived from the merge candidate list constructed with the motion information having the lower similarity, as a result of which the coding performance can be expected to be improved.

As a further modification, the inter prediction unit 241 may switch, by a flag, which one of the merge candidate list for the normal merge mode and the merge candidate list for the GPM is used as the merge candidate list used for deriving the motion vector.

Specifically, for example, a one-bit flag decoded by the decoding unit 210 is included in the control data, and the decoding unit 210 decodes or infers a value of the flag and transmits the value to the inter prediction unit 241, so that the switching can be performed.

Consequently, the inter prediction unit 241 can derive the motion information from more various variations, so that the prediction performance is improved, as a result of which the coding performance can be expected to be improved.
(GPM Weighting Factor)

Hereinafter, the weighting coefficient w of the GPM according to Non-Patent Literature 1 and the present embodiment related to the decoding unit 210, the inter prediction unit 241, the intra prediction unit 242, and the blending unit 243 will be described with reference to FIGS. 8 to 10.

Figure 8:
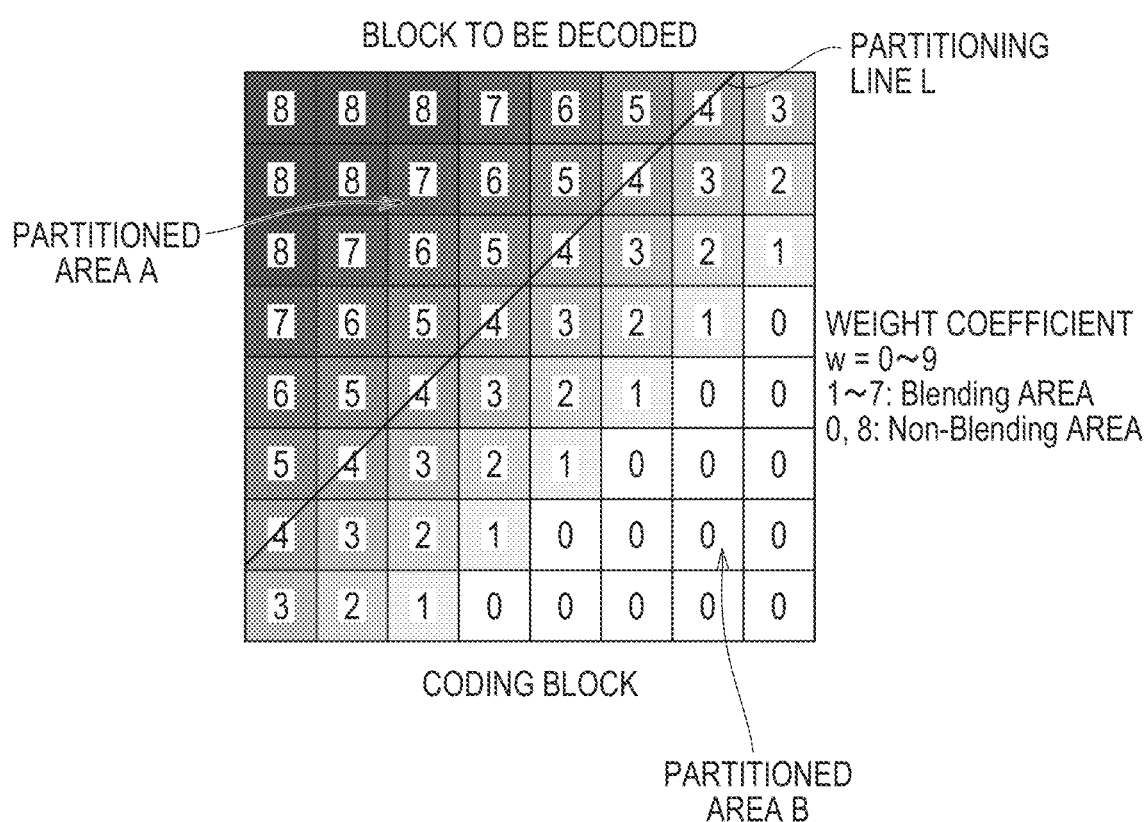
FIG. 8 is a diagram illustrating an example of a value of a weighting coefficient w for a predicted sample of each partitioned area A/B of GPM according to Non-Patent Literature 1 and the present embodiment.

FIG. 8 is a diagram illustrating an example of a value of the weighting coefficient w for a predicted sample of each partitioned area A/B of the GPM according to Non-Patent Literature 1 and the present embodiment.

The predicted samples of the respective partitioned areas A/B generated by the inter prediction unit 241 or the intra prediction unit 242 are blended (weighted average) by the weight coefficient w in the blending unit 243.

In Non-Patent Literature 1, a value of 0 to 8 is used as the value of the weighting coefficient w, and such a value of the weighting coefficient w may also be used in the present embodiment. Here, the values 0 and 8 of the weighting coefficient w indicate a non-blending area (non-blending area), and the values 1 to 7 of the weighting coefficient w indicate a blending area (blending).

Note that, in the present embodiment, the calculation method of the weighting coefficient w can be configured to be calculated as follows from the offset value (offsetX, offsetY) calculated from the sample position (xL, yL) and the target block size, the displacement (diplacementX, diplacementY) calculated from angleIdx that defines the angle of the partition line of the geometric partitioning mode (GPM) illustrated in FIG. 9, and the table value disLut calculated from diplacementX and diplacementY illustrated in FIG. 10, by a method similar to Non-Patent Literature 1.

weightIdx=(((xL+offsetX)<<1)+1)×disLut[diplacementX]+(((yL+offsetY)<<1)+1)×disLut[diplacementY]
weightIdxL=partFlip?32+weightIdx:32−weightIdx
w=Clip3(0,8,(weightIdxL+4)>>3)

[Prediction Information Storage Method in Inter Prediction Unit, Intra Prediction Unit, and Prediction Information Buffer]
(Stored Motion Information Type and Stored Prediction Information Type)

Hereinafter, the stored motion information type disclosed in Non-Patent Literature 1 and the stored prediction information type according to the present embodiment in the decoding unit 210, the inter prediction unit 241, the intra prediction unit 242, and the prediction information buffer 244 will be described with reference to FIG. 11.

FIG. 11 is a diagram illustrating an example in which the stored prediction information type disclosed in Non-Patent Literature 1 and the stored prediction information type according to the present embodiment are specified for each 4×4 sample sub-block.

Those types are the same in the calculation methods as described below, but as illustrated in FIG. 8, are different in that the stored information is motion information in Non-Patent Literature 1, but is prediction information in the present embodiment.

First, similarly to Non-Patent Literature 1, the value of the stored motion information type and the value of the stored prediction information type (since the calculation method is the same, hereinafter, for convenience, any value is defined as sType.) are calculated as follows from an index (xSbIdx, ySbIdx) in units of 4×4 sample sub-blocks, the offset value (offsetX, offsetY) calculated similarly to the weighting coefficient w described above, the displacement (diplacementX, diplacementY), and the table (disLut).

motionIdx=(((4×xSbIdx+offsetX)<<1)+5)×disLut[diplacementX]+(((4×ySbIdx+offsetY)<<1)+5)×disLut[diplacementY]
sType=Abs(motionIdx)<32?2:(motionIdx<=0?(1−isFlip):isFlip)

Here, as illustrated in FIG. 11, the value of sType includes three types of values of 0, 1, and 2, and the motion information and the prediction information stored in the prediction information buffer 244 are controlled by the inter prediction unit 241 and the intra prediction unit 242 as follows according to the respective values.

In a case where the value of sType is 0, the motion information of the partitioned area A is stored in Non-Patent Literature 1, and the prediction information of the partitioned area A is stored in the present embodiment.

In a case where the value of sType is 1, the motion information of the partitioned area B is stored in Non-Patent Literature 1, and the prediction information of the partitioned area B is stored in the present embodiment.

In a case where the value of sType is 2, in Non-Patent Literature 1, the motion information of the partitioned area A and the partitioned area B or the motion information of only the partitioned area B is stored, and in the present embodiment, the prediction information of the partitioned area A and the partitioned area B or the prediction information of only the partitioned area B is stored.

Here, the motion information and the prediction information to be stored will be described later.

Note that the calculation unit of sType described above and the storage unit of motion information or prediction information described later may be changed from the 4×4 sample sub-block unit described above with intention of a designer.

Specifically, in order to reduce the amount of information to be stored, a unit of calculation of sType described above and a unit of storage of motion information or prediction information described later may be increased to 8×8 samples, 16×16 samples, or the like.

Alternatively, although the amount of information to be stored increases, the calculation unit of sType described above and the storage unit of motion information or prediction information described later may be reduced to 2×2 samples or the like in order to improve the accuracy of motion information or prediction information when referred from another block or frame.

(Motion Information and Prediction Information Stored in Prediction Information Buffer)

The motion information disclosed in Non-Patent Literature 1 and the prediction information according to the present embodiment, which are stored in the prediction information buffer 244 from the inter prediction unit 241 will be described below with reference to FIGS. 12 and 13.

FIG. 12 is a diagram illustrating a list of the motion information disclosed in Non-Patent Literature 1 and the prediction information according to the present embodiment, which are stored according to the value of sType of the sub-block configuring the GPM-applied block.

First, the motion information finally stored in the GPM disclosed in Non-Patent Literature 1 includes the following parameters.

Prediction direction (predFlagL0, predFlagL1)
Motion vectors (mvL0, mvL1) of L0 and L1
Reference frame indexes (refIdxL0, refIdxL1) of L0 and L1
BcwIdx Note that the prediction direction (predFlagL0, predFlagL1) is a parameter indicating a prediction direction of a sub-block stored according to sType to be described later, and is classified into three types of L0 piece prediction, L1 piece prediction, and L0/L1 binary prediction on the basis of a value of predFlagL0 and a value of predFlagL1.

Here, the L0 piece prediction is an inter prediction based on one motion vector derived from the L0 list, and a case where predFlagL0 is 1 and predFlagL1 is 0 is stored as a value indicating this condition.

In addition, the L1 piece prediction is an inter prediction based on one motion vector derived from the L1 list, and a case where predFlagL0 is 0 and predFlagL1 is 1 is stored as a value indicating this condition.

In addition, the L0/L1 bi-prediction is an inter prediction based on two motion vectors derived from each of the L0 list and the L1 list, and a case where predFlagL0 is 1 and predFlagL1 is 1 is stored as a value indicating this condition.

The motion vectors (mvL0, mvL1) of L0 and L1 are motion vectors for the list numbers L0 and L1 described above.

Further, the reference frame indexes (refIdxL0, refIdxL1) of L0 and L1 are indexes indicating reference frames referred to by mvL0 and mvL1, respectively.

In addition, BcwIdx is an index for specifying a value of a weight coefficient of BCW (Bi-prediction with CU-level weights) disclosed in Non-Patent Literature 1.

As shown in FIG. 12, the prediction type and the intra prediction mode are added to the motion information stored in the prediction information buffer 244 disclosed in Non-Patent Literature 1 as parameters to be stored as the prediction information stored in the prediction information buffer 244 in the present embodiment.

Here, the prediction type is an internal parameter indicating either inter prediction (Inter) or intra prediction (Intra) as illustrated in FIG. 12.

Furthermore, as illustrated in FIG. 12, hpeIfIdx, IBC Flag, or LIC Flag may be added as the prediction information according to the present embodiment.

Here, hpeIfIdx and IBC Flag are flags that specify whether to apply a SIF (Switchable Interpolation Filter) and an IBC (Intra Block Copy) disclosed in Non-Patent Literature 1 and a LIC (Local Illumination Compensation) disclosed in Non-Patent Literature 2, respectively.

(Details of Prediction Information Stored according to Stored Prediction Information Type)

Details of the prediction information stored in the prediction information buffer 244 by the inter prediction unit 241 or the intra prediction unit 242 according to the stored prediction information type sType according to the present embodiment will be described below with reference to FIGS. 13 to 15.

FIG. 13 is a diagram illustrating an example of prediction information stored for a GPM including two different inter predictions as illustrated in FIG. 4. Hereinafter, details of each piece of prediction information saved according to the value of sType will be described.

First, that the prediction type is inter prediction (Inter) in all sType areas is stored in the prediction information buffer 244.

Second, predFlagL0, predFlagL1, mvL0, mvL1, refIdxL0, and refIdxL1 are stored as follows according to the value of sType and the values of predListFlagA and predListFlagB indicating the list number of the merge candidate list indicating the derivation destination of the motion vector of the partitioned area A/B described above, similarly to the method disclosed in Non-Patent Literature 1.

First, when sType=0, the following calculation is performed.

predFlagL0=(predListFlagA==0)?1:0
predFlagL1=(predListFlagA==0)?0:1
refIdxL0=(predListFlagA==0)?refIdxA:−1
refIdxL1=(predListFlagA==0)?−1:refIdxA
mvL0=(predListFlagA==0)?mvA:0
mvL1=(predListFlagA==0)?0:mvA Next, in a case of sType=1 or in a case of sType=2 and predListFlagA+predListFlagB≠1, calculation is performed as follows.

predFlagL0=(predListFlagB==0)?1:0
predFlagL1=(predListFlagB==0)?0:1
refIdxL0=(predListFlagB==0)?refIdxB:−1
refIdxL1=(predListFlagB==0)?−1:refIdxB
mvL0=(predListFlagB==0)?mvB:0
mvL1=(predListFlagB==0)?0:mvB Here, predListFlagA+predListFlagB≠1 indicates a case where the list numbers of the partitioned areas A/B coincide with each other. At this time, in order to avoid duplication of motion vectors, only the motion vectors of the partitioned area B are stored even in the case of sType=2.

Next, in a case of sType=2 and predListFlagA+predListFlagB=1, calculation is performed as follows.

predFlagL0=1
predFlagL1=1
refIdxL0=(predListFlagA==0)?refIdxA:refIdxB
refIdxL1=(predListFlagA==0)?refIdxB:refIdxA
mvL0=(predListFlagA==0)?mvA:mvB
mvL1=(predListFlagA==0)?mvB:mvA Here, predListFlagA+predListFlagB=1 indicates a case where the list numbers of the partitioned areas A/B do not match. At this time, the two motion vectors of the partitioned areas A/B are stored as they are.

Note that, although not illustrated in FIG. 13, the above-described mvL0 and mvL1 may store motion vectors before being corrected by Merge with Motion Vector Difference (MMVD) or Template Matching (Inter TM) for the GPM disclosed in Non-Patent Literature 2.

Alternatively, mvL0 and mvL1 described above may be motion vectors corrected by MMVD or Inter TM for GPM disclosed in Non-Patent Literature 2.

When the corrected motion vector is stored, the prediction accuracy of the prediction block that acquires the motion vector from the GPM-applied block and generates the prediction sample is improved.

On the other hand, in a case where the motion vector before correction is stored, improvement in prediction accuracy of the prediction block that refers to the motion vector from the GPM cannot be expected, but the derivation processing of the motion vector of the reference block to the GPM application block can be started without waiting for completion of the MMVD and the Inter-TM processing on the GPM block, so that a reduction in decoding processing time can be expected.

Note that which of the motion vectors before and after the correction is stored can be similarly selected for FIGS. 13 to 15 described later.

Next, the intra prediction mode may not be stored in all sType areas. Alternatively, a value indicating that intra prediction is invalid in all sType areas may be stored. This is because, in the configuration illustrated in FIG. 13, since all the areas are inter prediction, there is no intra prediction mode applied to the target block.

On the other hand, in a case where the reference destination of the motion information stored in each sType area is the intra prediction block as the intra prediction mode stored in each sType area, the intra prediction mode of the reference block may be stored as the intra prediction mode of the target block.

In the case that the reference destination of the motion information stored in each sType area is the inter prediction block, the intra prediction mode of the target block may be stored as a Planar mode, or the intra prediction mode may be recursively tracked using the reference destination of the motion information stored in the inter prediction block of the reference destination.

However, since there is a limit to the tracking range, if the reference destination of the intra prediction mode is not found in the case where the tracking upper limit is reached, the Planar mode may be saved as the intra prediction mode of the target block.

Therefore, even if the prediction type of the predetermined area of the target block is the inter prediction, in the case where the target block is referred to from another block (for example, adjacent block) in the frame, the intra prediction can be referred to.

Next, values indicating that BcwIdx, hpelIfIdx, IBC Flag, and LIC Flag are invalid values in all sType areas may be stored. This is because all of BCW, SIF, IBC, and LIC are encoding tools exclusive to GPM, and thus it is obvious that these coding tools are invalid in the target block to which GPM is applied.

In relation, although not shown in FIGS. 12 and 13, the motion vectors used in IBC may not be stored, or 0 vectors may be stored. These parameters can have a similar configuration in FIGS. 14 and 15 to be described later, and thus the detailed description of these parameters in FIGS. 14 and 15 will be omitted below.

FIG. 14 and FIG. 15 are diagrams illustrating an example of prediction information stored for a GPM configured by intra prediction and inter prediction as illustrated in FIG. 6. Hereinafter, details of each piece of prediction information stored according to the value of sType will be described.

First, regarding the prediction information stored in the partitioned area (the partitioned area of Inter) to which the inter prediction is applied in a case of sTyper=1, in the present embodiment, the one-sided prediction is applied in a case where the target block is not included in the B slice (in a case where the target block is included in the P slice), but the bi-prediction is applied depending on the motion information of the merge candidate corresponding to the merge index as described above in a case where the target block is included in the B slice.

Hereinafter, the prediction information stored in the partitioned area (the partitioned area of Inter) to which the inter prediction is applied in the case of sTyper=1 in these two cases will be described.

FIG. 14 illustrates an example of prediction information stored in a case where the target block is not included in the B slice (in a case where the target block is included in the P slice) and the one-sided prediction is applied.

As illustrated in FIG. 14, the stored prediction information can have the same configuration as the configuration example of the prediction information stored in the partitioned area (the partitioned area of Inter) to which the inter prediction is applied in the case of sTyper=1 in FIG. 13.

In contrast to FIG. 14, FIG. 15 illustrates an example of prediction information stored in a case where the target block is included in the B slice and bi-prediction is applied.

As illustrated in FIG. 15, the stored prediction information is different from a configuration example of the prediction information stored in the partitioned area (the partitioned area of Inter) to which the inter prediction is applied in the case of sTyper=1 in FIG. 13.

Specifically, the motion vectors MVL0 and MVL1 of each of L0 and L1 and indexes RefIdxL0 and RefIdxL1 indicating the reference frames of each of L0 and L1 are stored from the motion information included in the merge candidate corresponding to one merge index with respect to the partitioned area.

Note that, also in the case of FIG. 15, the intra prediction mode among the stored prediction information may have the same configuration as the configuration example of the prediction information stored in the partitioned area (the partitioned area of Inter) to which the inter prediction is applied in the case of sTyper=1 in FIG. 13.

Secondly, the prediction information stored in the partitioned area (Intra partitioned area) to which intra prediction is applied when sTyper=0 is stored as follows as illustrated in FIG. 14 and FIG. 15.

Prediction type=Intra
predFlag0=0
predFlag1=0
mvL0=0
mvL1=0
refIdxL0=−1
refIdxL1=−1
intra prediction mode=modeX Here, since intra prediction is applied to such a partitioned area, Intra is stored as the prediction type, and modeX is stored as the intra prediction mode, as described above.

Note that, as a modified example, for example, as in Non-Patent Literature 1, in a case where only an coding tool that refers only to the intra prediction type in units of sub-blocks from the neighbor and does not refer to the intra prediction mode is included, a configuration may be employed in which the intra prediction mode is not saved while Intra is saved as the prediction type.

On the other hand, since there is no motion information, as described above, 0 may be stored as predFlag0 and predFlagL1, 0 (meaning a 0 vector) may be stored as mvL0 and mvL1, and −1 (meaning that there is no reference frame) may be stored as refIdxL0 and refIdxL1.

Alternatively, as a modification, in order to avoid a tight capacity of the buffer area of the prediction information buffer 244, the motion information may not be stored.

Third, the prediction information stored in the partitioned area (the partitioned area of Intra+Inter) to which the intra prediction and the inter prediction are applied in the case of sTyper=2 differs as illustrated in FIGS. 14 and 15 depending on the configuration of the prediction information stored in sType=1 described above.

In the case illustrated in FIG. 14, the prediction information is stored as follows.

Prediction type=Inter
    predFlag0=(predListFlagB==0)?1:0
    predFlag1=(predListFlagB==0)?0:1
    refIdxL0=(predListFlagB==0)?refIdxB:−1
    refIdxL1=(predListFlagB==0)?−1:refIdxB
    mvL0=(predListFlagB==0)?mvB:0
    mvL1=(predListFlagB==0)?0:mvB   intra prediction mode=modeX On the other hand, in the case illustrated in FIG. 15, the prediction information is stored as follows.

Prediction type=Inter
    predFlag0=1
    predFlag1=1
    refIdxL0=RefIdxL0
    refIdxL1=RefIdxL1
    mvL0=MVL0
    mvL1=MVL1
    intra prediction mode=modeX Here, since the intra prediction of sType=1 is applied in such a partitioned area, the same parameters as those stored in sType=1 are stored as the prediction type and the intra prediction mode among the prediction information as described above. When there are two types of intra prediction modes that can be stored in the future, an intra prediction mode of sType=0 may be additionally stored in the partitioned area.

Furthermore, in such a partitioned area, since the inter prediction of sType=2 is applied, the same parameters as those stored with sType=2 are stored as the parameters related to the motion field information among the prediction information as described above.

FIG. 16 is a diagram illustrating an example of prediction information stored for a GPM including two different intra predictions as illustrated in FIG. 7. Hereinafter, details of each piece of prediction information saved according to the value of sType will be described.

Firstly, among the prediction information stored in all the sType areas, the parameters other than the intra prediction mode can have the same configuration as the parameters stored in the Intra partitioned area in the case of sType=0 described in FIG. 14, and thus the description thereof will be omitted.

Secondly, as the intra prediction modes of the area of sType=0 and the area of sType=1, as illustrated in FIG. 15, two different intra prediction modes modeX and modeY applied in each area are stored.

Third, in the area of sType=2, as illustrated in FIG. 15, both the intra prediction modes of the area of sType=0 and the area of sType=1 may be stored, or any one of the intra prediction modes may be stored.

For the former, for example, in a case where two intra prediction modes can be used in the image encoding device 100 and the image decoding device 200, two intra prediction modes may be stored.

For the latter, for example, the intra prediction mode of sType=0 may be selected as the intra prediction mode of sType=2 by decision.

Alternatively, for example, from which intra prediction mode the 4×4 sample sub-block is dominantly generated may be calculated, for example, in units of 2×2 sample sub-blocks obtained by further subpartitioning the 4×4 sample sub-block, and the dominant intra prediction mode may be selected as the intra prediction mode of the area of sType=2.

Alternatively, a smaller distance between the sub-block and the adjacent reference sample existing in the direction indicated by the two intra prediction modes of the sub-block may be selected as the intra prediction mode of sType=2.

With use of the prediction information and the method for storing the prediction information described above, it is possible to appropriately refer to the prediction information in a case where the intra prediction is added to the GPM from the inside of the frame or the outside of the frame, as a result of which improvement of the coding performance can be expected.

Note that, among the prediction information stored in the prediction information buffer 244 described above, parameters other than the intra prediction mode may be deleted from the prediction information buffer 244 in a case where the parameters are no longer referred to from inside or outside the frame.

In addition, when a storage area for the parameter is secured in the prediction information buffer 244, the storage area may be initialized. Here, timing at which reference from the outside of the frame is stopped is the same as the timing at which the frame including the GPM applied block is deleted from the frame buffer 260 (frame buffer 160).

Further, among the prediction information stored in the prediction information buffer 244, the intra prediction mode may be deleted from the prediction information buffer 244 when the intra prediction mode is no longer referred to from the frame. Furthermore, in a case where a storage area corresponding to the intra prediction mode is secured in the prediction information buffer 244, the storage area may be initialized.

[Predicted Sample Generation Method in Inter Prediction Unit 241, Intra Prediction Unit 242, and Blending Unit 243] (Overlapped Block Motion Compensation and Decoder Motion Vector Correction)

Hereinafter, overlapped block motion compensation (OBMC) disclosed in Non-Patent Literature 2 related to the decoding unit 210 and the inter prediction unit 241 will be described with reference to FIGS. 17 and 18.

FIG. 17 illustrates two examples of rectangular blocks to be decoded which are motion compensated (MC) by the OBMC disclosed in Non-Patent Literature 2.

Figure 17A:
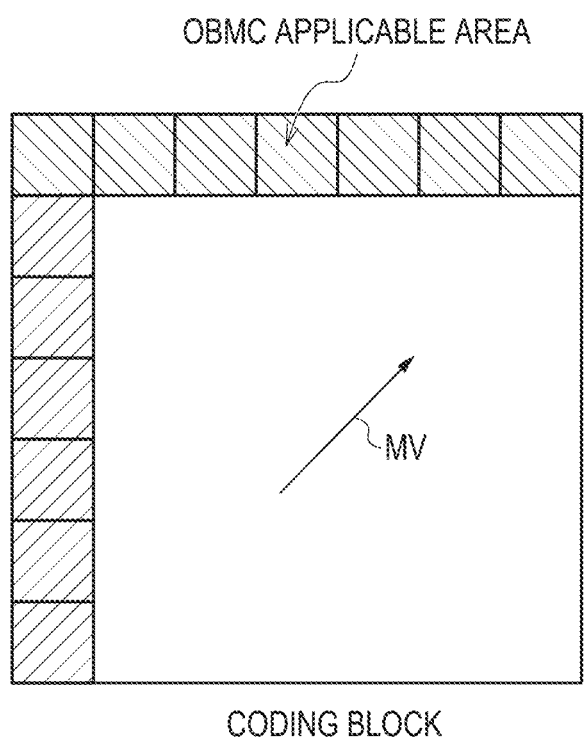
FIG. 17A is a diagram illustrating an example of a rectangular coding block that is motion-compensated by an OBMC disclosed in Non-Patent Literature 2.

FIG. 17A illustrates an example in which the OBMC is applied to block boundaries facing an upper side and a left side of a coding block in a case where a motion vector (MV) included in the coding block is uniform with respect to the coding block.

Figure 17B:
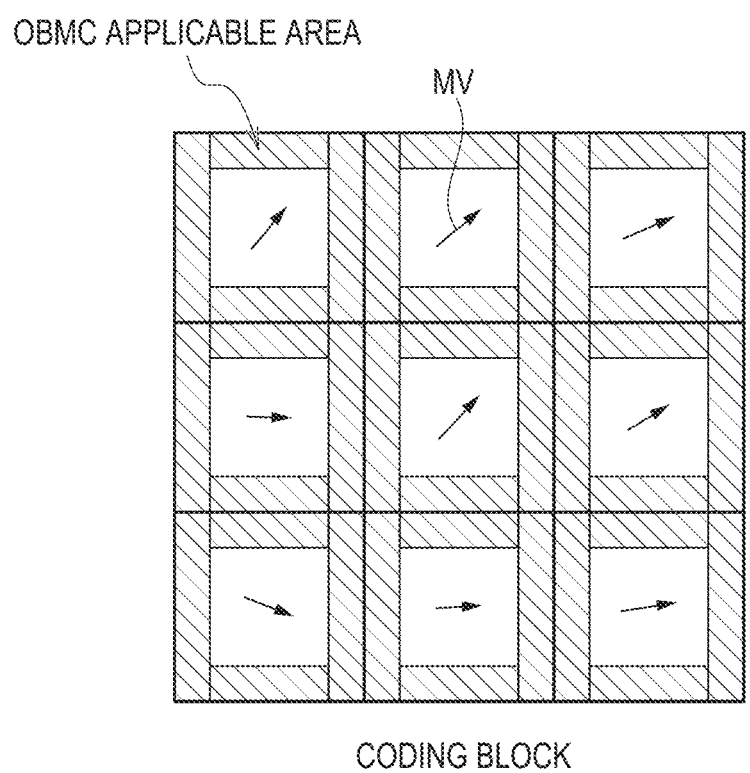
FIG. 17B is a diagram illustrating an example of the rectangular coding block that is motion-compensated by the OBMC disclosed in Non-Patent Literature 2.

On the other hand, FIG. 17B illustrates an example in which the OBMC is applied to upper, lower, left, and right block boundaries of each block in a case where the MV of the coding block is not uniform with respect to the coding block, for example, in a case where the coding block has different MVs for each predetermined block size as illustrated in FIG. 17B.

The example illustrated in FIG. 17B may occur, for example, in a case where a decoder motion vector refinement (DMVR) disclosed in Non-Patent Literature 1 is valid.

Here, the DMVR is a technique for correcting the derived motion vector by re-searching in units of 16×16 samples after the inter prediction unit 241 derives the motion vector.

The DMVR is a decoding tool limited to bi-prediction. In addition, in Non-Patent Literature 1, there is a bi-prediction-limited tool called BDOF (Bi-dictional Optical Flow) in addition to the DMVR.

In the GPM disclosed in Non-Patent Literature 1, the application of DMVR and BDOF is limited at the time of inter prediction of each partitioned area, but since bi-prediction can be applied to the inter prediction area of the Intra/Inter-GPM in the present embodiment, the inter prediction unit 241 may apply DMVR or BODF to the inter prediction area of Intra/Inter-GPM.

As a result, the accuracy of the predicted sample value generated by bi-prediction of the inter prediction area of the Intra/Inter-GPM is improved, so that a further effect of coding performance can be expected.

Note that, since the same configuration as that of Non-Patent Literature 1 can be used in the present embodiment as a method of determining whether the DMVR or the BODF is applied, detailed description thereof is omitted.

On the other hand, the inter prediction unit 241 may always restrict (prohibit) the application of the DMVR or the BODF even when the bi-prediction can be applied to the inter prediction area of the Intra/Inter-GPM in the present embodiment.

That is, even when the determination condition that the DMVR or the BODF is not applicable disclosed in Non-Patent Literature 1 described above is satisfied, the application of the DMVR or the BODF is restricted to the inter prediction area of Intra/Inter-GPM.

Specifically, the restriction can be realized by adding the determination condition based on a flag indicating whether the GPM disclosed in Non-Patent Literature 1 of the coding block is applied to the DMVR or the BODF application condition disclosed in Non-Patent Literature 1.

As a result, although further improvement in coding performance cannot be expected, it is possible to avoid an increase in the processing amount of the inter prediction unit 241 due to re-search or the like by additional application of the DMVR or the BDOF to the inter prediction area of the Intra/Inter-GPM.

(Application Control Method of Overlapped Block Motion Compensation)

In addition, determination processing as to whether or not the OBMC disclosed in Non-Patent Literature 2 is applied and OBMC application processing in a case where the OBMC is applied are performed in units of sub-blocks (hereinafter, the target sub-block) of 4×4 samples as illustrated in FIG. 17.

Figure 18:
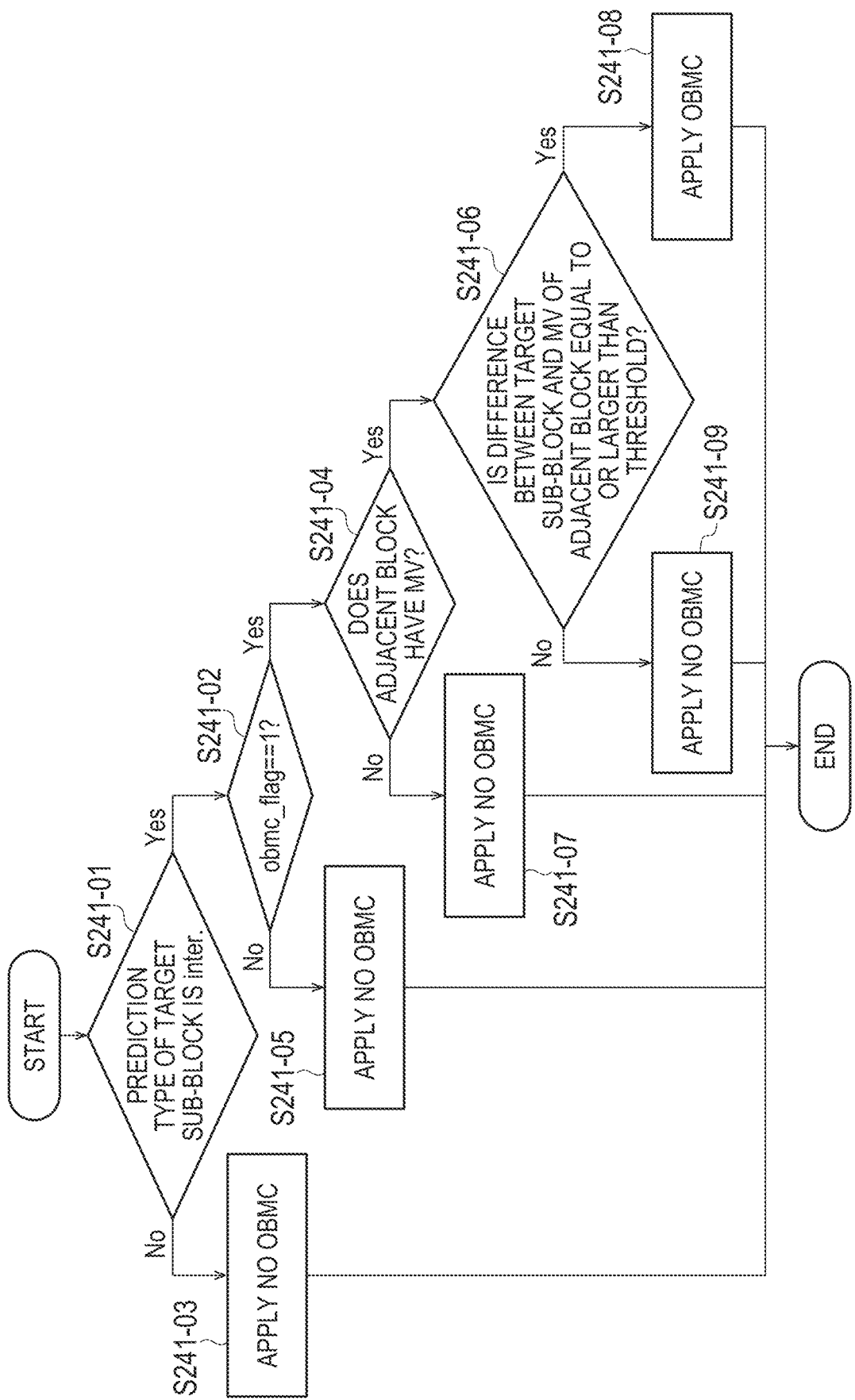
FIG. 18 is a flowchart illustrating an example of operation of an inter prediction unit 241.

In Non-Patent Literature 2, as illustrated in FIG. 18, the inter prediction unit 241 determines whether or not the OBMC is applied.

As illustrated in FIG. 18, in Step S241-01, the inter prediction unit 241 determines whether the prediction type of the target sub-block is the inter prediction (Inter prediction).

When it is determined that the condition is satisfied, the operation proceeds to Step S241-02, and when it is determined that the condition is not satisfied, that is, when it is determined that the prediction type of the target sub-block is the intra prediction (Intra prediction), the operation proceeds to Step S241-03.

In Step S241-03, the inter prediction unit 241 determines that the OBMC is not applied in the target sub-block, and this operation ends.

In Step S241-02, the inter prediction unit 241 determines whether obmc_flag of the target sub-block is 1.

When it is determined that such a condition is satisfied, the present operation proceeds to Step S241-04, and when it is determined that such a condition is not satisfied, that is, when obmc_flag is determined to be 1, the present operation proceeds to Step S241-05. In Step S241-05, the inter prediction unit 241 determines that the OBMC is not applied in the target sub-block, and this operation ends.

Here, obmc_flag is syntax indicating that the OBMC is not applicable in units of blocks to be decoded. A value of obmc_flag of 0 indicates that the OBMC is not applied, and a value of obmc_flag of 1 indicates that the OBMC is applied.

As to whether the value of obmc_flag is 0 or 1, the decoding unit 210 decodes and specifies the value, or infers the value without decoding.

Since the obmc_flag decoding method, the obmc_flag value specifying method, and the obmc_flag estimation method can have the same configurations as those of Non-Patent Literature 2, detailed description thereof will be omitted.

In Step S241-04, the inter prediction unit 241 determines whether or not an adjacent block that crosses a block boundary with respect to the target sub-block has a motion vector (MV).

When it is determined that such a condition is satisfied, the present operation proceeds to Step S241-06, and when it is determined that such a condition is not satisfied, the present operation proceeds to Step S241-07.

In Step S241-07, the inter prediction unit 241 determines that the OBMC is not applied in the target sub-block, and this operation ends.

In Step S241-06, the inter prediction unit 241 determines whether or not a difference between the MV of the target sub-block and the MV of the adjacent block is equal to or larger than a predetermined threshold.

When it is determined that such a condition is satisfied, the present operation proceeds to Step S241-08, and when it is determined that such a condition is not satisfied, the present operation proceeds to Step S241-09.

In Step S241-08, the inter prediction unit 241 determines that the OBMC is applied in the target sub-block, and this operation ends. On the other hand, in Step S241-09, the inter prediction unit 241 determines that the OBMC is not applied in the target sub-block, and this operation ends.

Here, a fixed value may be used as the predetermined threshold. For example, the predetermined threshold may be one sample. Alternatively, 0 samples may be used (that is, it is determined that OBMC is applied only when there is no exact match.).

Alternatively, a variable value corresponding to the number of MVs included in the target sub-block may be used as the predetermined threshold. For example, when the target sub-block has one MV, the predetermined threshold may be set to one sample, and when the target sub-block has two MVs, the predetermined threshold may be set to 0.5 samples.

With the above configuration, in Non-Patent Literature 2, the discontinuity (hereinafter, block boundary distortion) of the block boundary between the target sub-block and the adjacent block is eliminated by applying the OBMC only when the difference in MV from the adjacent block is large with respect to the target sub-block having MV, as a result of which, improvement in prediction performance can be expected.

(Application Example and Application Control Method of the OBMC to the GPM)

Hereinafter, an application example and an application control method of the OBMC for the GPM related to the decoding unit 210, the inter prediction unit 241, and the intra prediction unit 242 will be described with reference to FIGS. 19 and 20.

Figure 19:
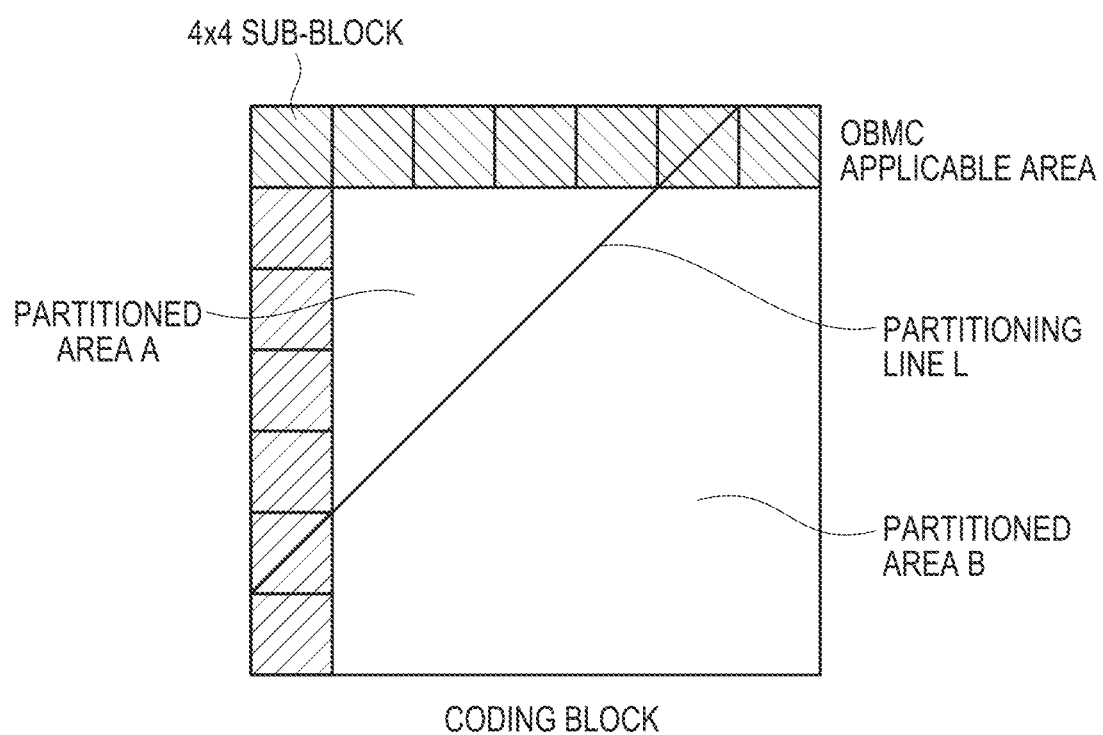
FIG. 19 illustrates an example of application of the OBMC to a block to which the GPM is applied in the present embodiment.

FIG. 19 illustrates an application example of the OBMC for block boundaries on the upper side and the left side of a coding block to a block to which the GPM is applied in the present embodiment.

As illustrated in FIG. 19, there are a maximum of three patterns in the target sub-block to which the OBMC is applied according to the partition shape (partition line L) of the GPM.

Specifically, a first pattern includes target sub-blocks belonging to the partitioned area A, a second pattern includes target sub-blocks belonging to the partitioned area B, and a third pattern includes target sub-blocks belonging to both the partitioned areas A/B.

The target sub-blocks of the three patterns are further partitioned depending on whether the prediction type applied to the partitioned area A and the partitioned area B is inter prediction or intra prediction.

Specifically, the target sub-blocks of the first pattern and the second pattern are partitioned into two cases of inter prediction and intra prediction.

On the other hand, the target sub-block of the third pattern is partitioned into a total of three cases of two different inter prediction cases, an inter prediction case and an intra prediction case, and two different intra prediction cases.

In the present embodiment, the target sub-block has only one prediction type. Therefore, in the target sub-block of the third pattern, the prediction type of the target sub-block is determined by a combination of two predictions configuring the target sub-block. Specifically, the prediction type including two different inter predictions is treated as the inter prediction, the prediction type including the inter prediction and the intra prediction is treated as the inter prediction, and the prediction type including two different intra predictions is treated as the intra prediction.

Here, it should be determined that the OBMC is not applicable to the target sub-block of which the prediction type is intra prediction among the target sub-blocks to which the OBMC is applied for the following reasons. This is because the predicted sample of the target sub-block under the same condition is generated by the intra prediction using a reference sample (reconstructed sample) adjacent to the target sub-block, and thus block boundary distortion is less likely to qualitatively occur at a block boundary between the reference sample and the generated predicted sample as in the inter prediction.

For the above reasons, in the present embodiment, the application of the OBMC is restricted to the target sub-block whose prediction type is the intra prediction among the target sub-blocks to which the OBMC is applied (OBMC is not applicable).

On the other hand, in the present embodiment, the OBMC is applicable to the target sub-block whose prediction type is the inter prediction among the target sub-blocks to which the OBMC is applied.

Figure 20:
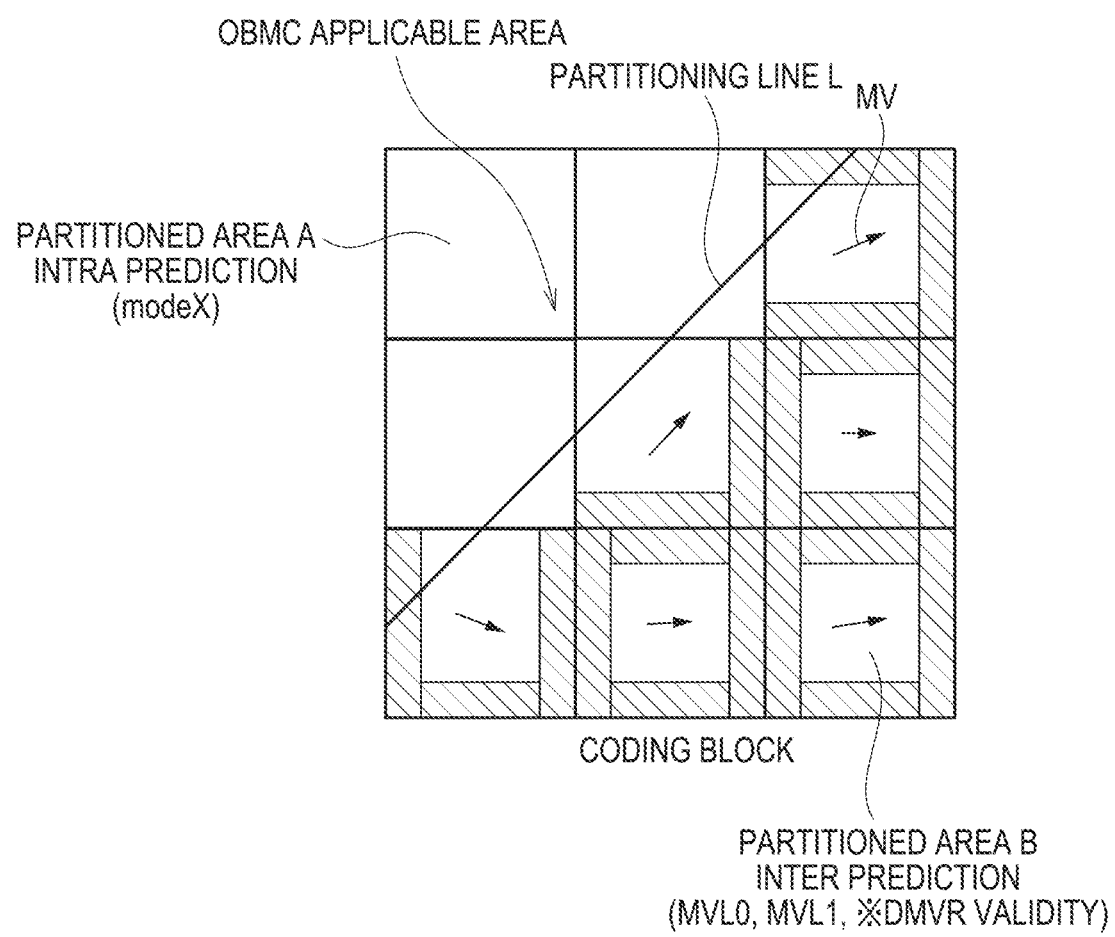
FIG. 20 is a diagram illustrating an example in which, in a case where bi-prediction is applied to an inter prediction area of the Intra/Inter-GPM, the DMVR is applied to the area, and motion vectors of predetermined block sizes configuring the area are different, the OBMC is applied to upper, lower, left, and right block boundaries of the blocks in the present embodiment.

FIG. 20 is a diagram illustrating an example in which, in a case where bi-prediction is applied to an inter prediction area of the Intra/Inter-GPM, the DMVR is applied to the area, and motion vectors of predetermined block sizes configuring the area are different, the OBMC is applied to upper, lower, left, and right block boundaries of the blocks in the present embodiment.

In the case of FIG. 20, the application of the OBMC may be restricted (prohibited) in the intra area, similarly to the case described above.

Furthermore, in the case of FIG. 20, the application of the OBMC applied to the upper, lower, left, and right block boundaries for each predetermined block size configuring the coding block may be determined again on the basis of the method of controlling the application of the OBMC in units of blocks illustrated in FIG. 18.

Specifically, as illustrated in FIG. 20, the OBMC is controlled not to be applied to a block boundary to which intra areas of blocks to be decoded are adjacent, thereby making it possible to avoid unnecessary application of the OBMC.

Hereinafter, a method of generating a final predicted sample in consideration of the applicability of the OBMC to the GPM according to the present embodiment will be described.

(Method for Generating Final Predicted Sample in Consideration of Applicability of OBMC to GPM)

Hereinafter, with reference to FIGS. 3 and 21 to 26, a method of generating a final predicted sample in consideration of the applicability of the OBMC to the GPM according to the inter prediction unit 241, the intra prediction unit 242, and the blending unit 243 of the present embodiment will be described.

[Method 1 (Configuration 1)]

Figure 21:
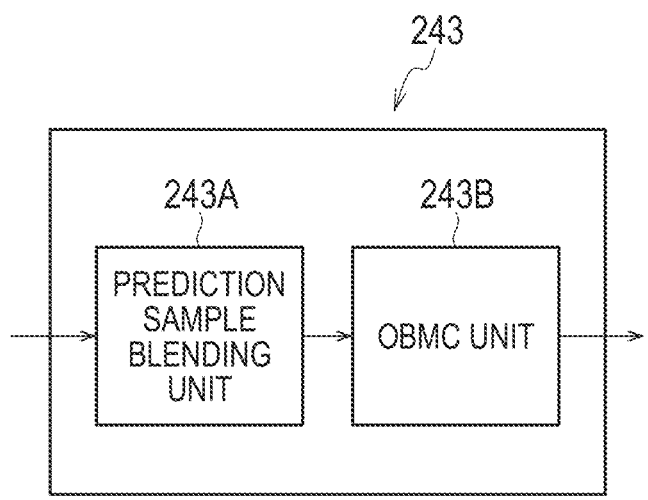
FIG. 21 is a diagram illustrating an example of functional blocks of the blending unit 243 according to a method 1 (configuration 1).

In a method 1 (configuration 1), as illustrated in FIG. 21, the blending unit 243 illustrated in FIG. 3 includes a predicted sample blending unit 243A and an OBMC unit 243B.

The predicted sample blending unit 243A is configured to blend the motion compensation samples (MC samples) output from the inter prediction unit 241 or the intra prediction unit 242 with the intra predicted samples, and then output the predicted samples to the OBMC unit 243B.

Furthermore, in a case where the coding block is a GPM-applied block, the predicted sample blending unit 243A is configured to blend (weighted average) the predicted samples output from the inter prediction unit 241 or the intra prediction unit 242 by the weighting coefficient w described above.

The OBMC unit 243B is configured to determine whether or not the OBMC is applicable to the predicted sample of the coding block output from the predicted sample blending unit 243A according to the OBMC application control method described above in units of sub-blocks facing the block boundary of the coding block, and output a final predicted sample.

With the above configuration, the following two effects can be expected.

First, since the OBMC can be appropriately applied to the sub-block facing the block boundary of the coding block to which the GPM is applied (specifically, OBMC is applicable to a sub-block whose prediction type is the inter prediction, and the OBMC is not applicable to a sub-block whose prediction type is intra prediction), as a result, improvement in prediction performance can be expected.

However, the present configuration example partially has the following problems. Specifically, even in the case of a sub-block whose prediction type is the inter prediction, in the case of a sub-block originally having two prediction types of inter prediction and intra prediction, it is better to blend the inter predicted sample and the intra prediction after application of the OBMC than to apply the OBMC after blending the inter predicted sample and the intra predicted sample. This is because, in the former case, the OBMC is also applied to the intra predicted sample in which the block boundary distortion is originally less likely to occur with the adjacent sample, but in the latter case, the OBMC is not applied. A method of generating a final predicted sample that solves this problem will be described later as a modification of the present configuration.

Secondly, since the OBMC can be applied to the predicted sample blended (weighted average) by the GPM by determining the applicability of the OBMC, it is possible to suppress an increase in the number of processing executions (processing stage) of the OBMC and the memory bandwidth necessary for the execution of the OBMC to the minimum necessary for the conventional GPM.

Specifically, since there is a case where the GPM-applied block includes up to two inter predictions, that is, two MVs, the worst value (maximum value) of the reference area in the GPM-applied block is the number of samples of the reference area indicated by the two MVs. On the other hand, when the OBMC is applied to the GPM-applied block, an additional reference area of the adjacent MVs is required. However, in the case of the present configuration, since the OBMC is applied to the predicted sample blended (weighted average) by the GPM, it is possible to avoid applying the OBMC to each of the maximum two inter predictions configuring the GPM-applied block, and it is possible to suppress an increase in the additional reference area by the OBMC to ½ with respect to the avoidance pattern. In the same way of thinking, the processing execution number (processing stage) of the OBMC can also be suppressed to ½ with respect to the avoidance pattern.

[Method 2 (Configuration 2)]

Figure 22:
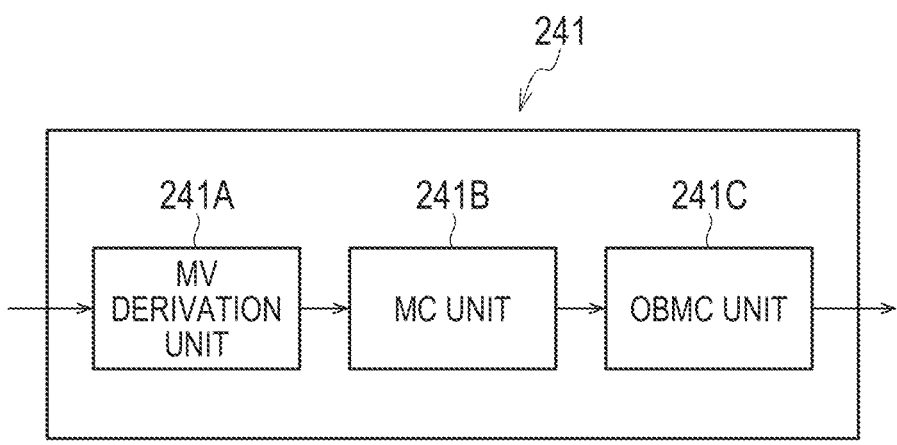
FIG. 22 is a diagram illustrating an example of functional blocks of the inter prediction unit 241 according to a method 2 (configuration 2).

FIG. 22 is a modification of the method (configuration) of generating the final predicted sample in consideration of the applicability of the OBMC to the GPM that can be realized in FIG. 14.

In a method 2 (configuration 2), as shown in FIG. 22, the inter prediction unit 241 includes an MV derivation unit 241A, an MC unit 241B, and an OBMC unit 241C.

The MV derivation unit 241A is configured to output the MV necessary for the inter prediction including the GPM to the MC unit 241B based on a reference frame output from the frame buffer unit and control data output from the decoding unit 210.

The MC unit 241B is configured to generate an MC sample on the basis of the MV output from the MV derivation unit 241A and the reference frame output from the frame buffer unit, and output the MC sample to the OBMC unit 241C.

The OBMC unit 241C is configured to determine whether or not the OBMC is applicable to the MC sample output from the MC unit 241B, and when the OBMC is applicable, generate a final motion compensation sample by applying the OBMC and output the final motion compensation sample to the blending unit 243 in a subsequent stage.

Note that the blending unit 243 in the subsequent stage of this configuration does not include the OBMC unit 243B described in method 1 (configuration 1), and is configured to blend the motion compensation samples or the intra predicted samples output from the inter prediction unit 241 or the intra prediction unit 242.

That is, with respect to the OBMC unit 243B described above, the OBMC unit 241C can determine that the OBMC is not applicable to only the sub-block of which the prediction type is the inter prediction.

With the present configuration illustrated in FIG. 22, improvement in prediction performance can be further expected with respect to the configuration 1 illustrated in FIG. 21, while a memory bandwidth required for the OBMC and the number of processing executions of the OBMC increase.

Specifically, since the OBMC can be directly executed for only the inter predicted samples before generation of the final predicted sample of the GPM by the blending unit 243, even if the above-described prediction type is the inter prediction, the OBMC can be not applied to the intra predicted samples of the sub-block originally having two prediction types of the inter prediction and the intra prediction. As a result, it is possible to avoid unnecessary application of the OBMC to the intra-predicted sample in which a block boundary distortion is originally less likely to occur with an adjacent sample, and as a result, prediction performance is improved.

On the other hand, since the OBMC is directly executed only for the inter predicted sample before the generation of the final predicted sample of the GPM by the blending unit 243, a memory bandwidth required for the OBMC and the number of executed processes of the OBMC are doubled as compared with the configuration 1 described above.

[Method 3 (Configuration 3)]

A method 3 (configuration 3), which is a modification of the method (method 1) of generating the final predicted sample in consideration of the applicability of the OBMC to the GPM that can be realized in FIGS. 2, 3, and 21 or the method (method 2) of generating the final predicted sample in consideration of the applicability of the OBMC to the GPM that can be realized in FIGS. 2, 3, and 22, will be described with reference to FIGS. 23 to 25.

Figure 23:
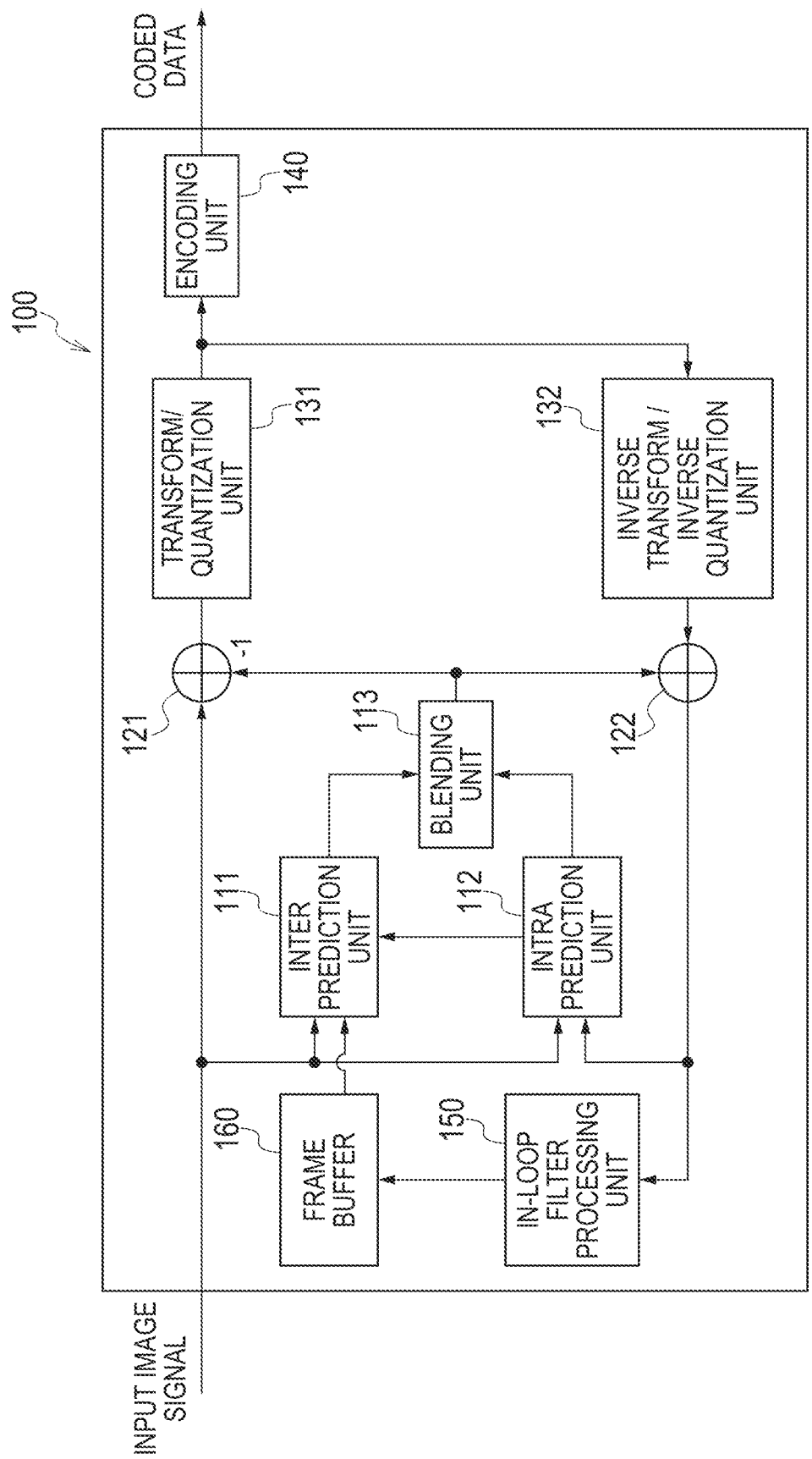
FIG. 23 is a diagram illustrating an example of functional blocks of an image encoding device 100 according to a method 3 (configuration 3) or a method 4 (configuration 4).

In the method 3 (configuration 3), as illustrated in FIG. 23, a line through which the intra prediction unit 112 outputs an intra predicted sample to the inter prediction unit 111 is added to FIG. 2. As a result, as will be described later, the inter prediction unit 111 can generate a final predicted sample weighted and averaged by the GPM. That is, the blending unit 113 in method 1 (configuration 1) or the method 2 (configuration 2) described above can be made unnecessary.

Figure 24:
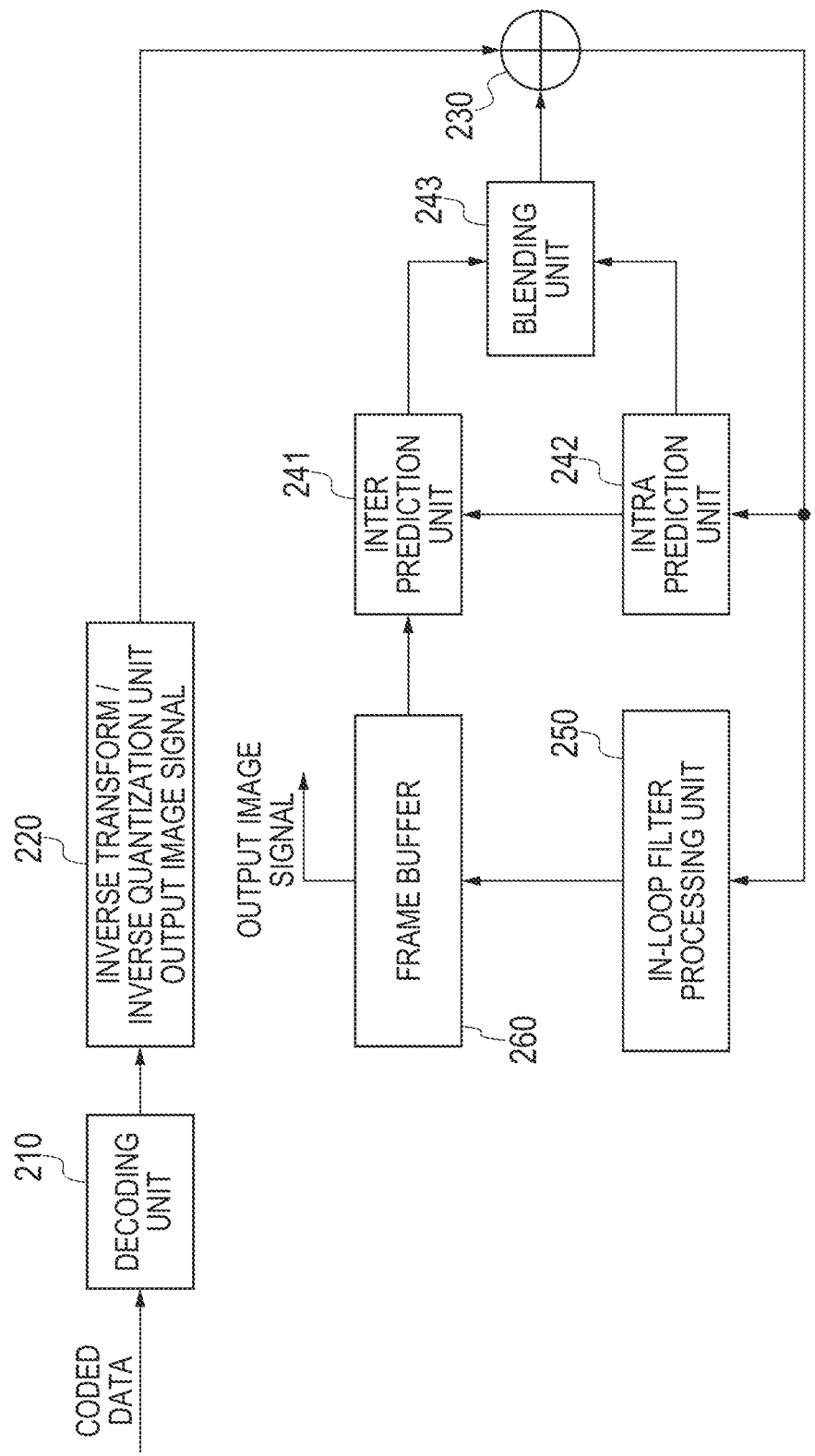
FIG. 24 is a diagram illustrating an example of functional blocks of an image decoding device 200 according to the method 3 (configuration 3) or the method 4 (configuration 4).

Further, in the method 3 (configuration 3), as illustrated in FIG. 24, a line through which the intra prediction unit 242 outputs the intra predicted sample to the inter prediction unit 241 is added to FIG. 3. As a result, as will be described later, the inter prediction unit 241 can generate a final predicted sample weighted and averaged by the GPM. That is, the blending unit 243 in the method 1 (configuration 1) or method 2 (configuration 2) described above can be made unnecessary.

Figure 25:
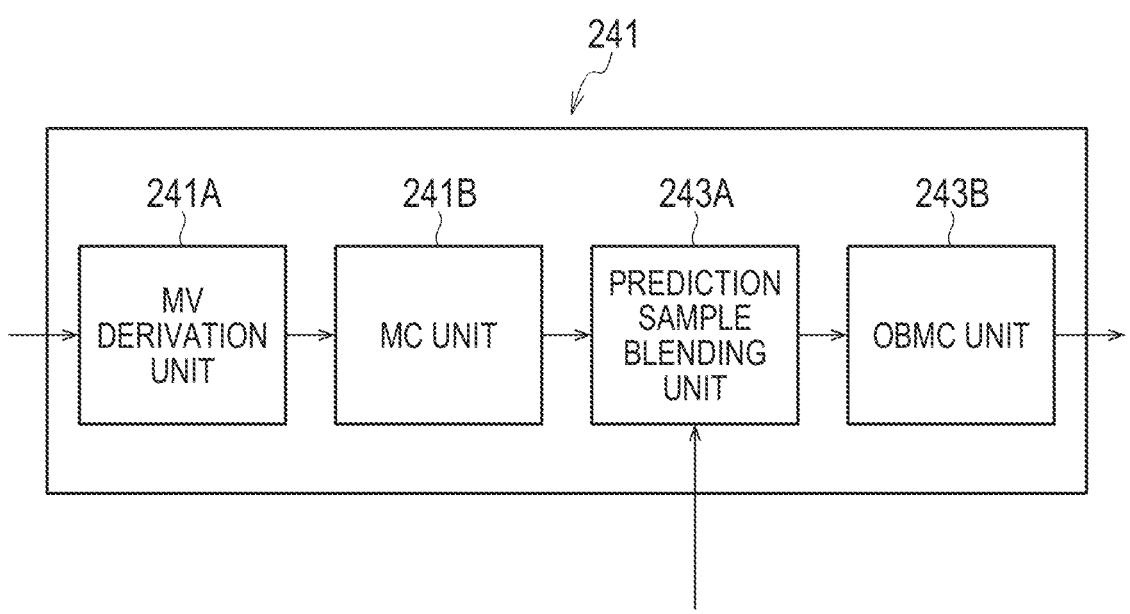
FIG. 25 is a diagram illustrating an example of functional blocks of the inter prediction unit 241 according to the method 4 (configuration 4).

In the method 3 (configuration 3), as shown in FIG. 25, the inter prediction unit 241 (111) includes an MV derivation unit 241A, an MC unit 241B, a predicted sample blending unit 243A, and an OBMC unit 241C.

Here, the MV derivation unit 241A and the MC unit 241B can have the same configuration as the MV derivation unit 241A and the MC unit 241B illustrated in FIG. 22.

Furthermore, the predicted sample blending unit 243A and the OBMC unit 243B can have the same configuration as the predicted sample blending unit 243A and the OBMC unit 243B of the blending unit 243 illustrated in FIG. 21.

The effects expected from the above configuration are the same as those of the configuration 1.

[Method 4 (Configuration 4)]

A method 4 (configuration 4) will be described with reference to FIGS. 23, 24, and 26, the method 4 being a modification of the method (method 1) of generating the final predicted sample in consideration of the applicability of the OBMC to the GPM that can be realized in FIGS. 2, 3, and 21 or the method (method 2) of generating the final predicted sample in consideration of the applicability of the OBMC to the GPM that can be realized in FIGS. 2, 3, and 22. Hereinafter, only differences from the previously described configuration will be described.

Figure 26:
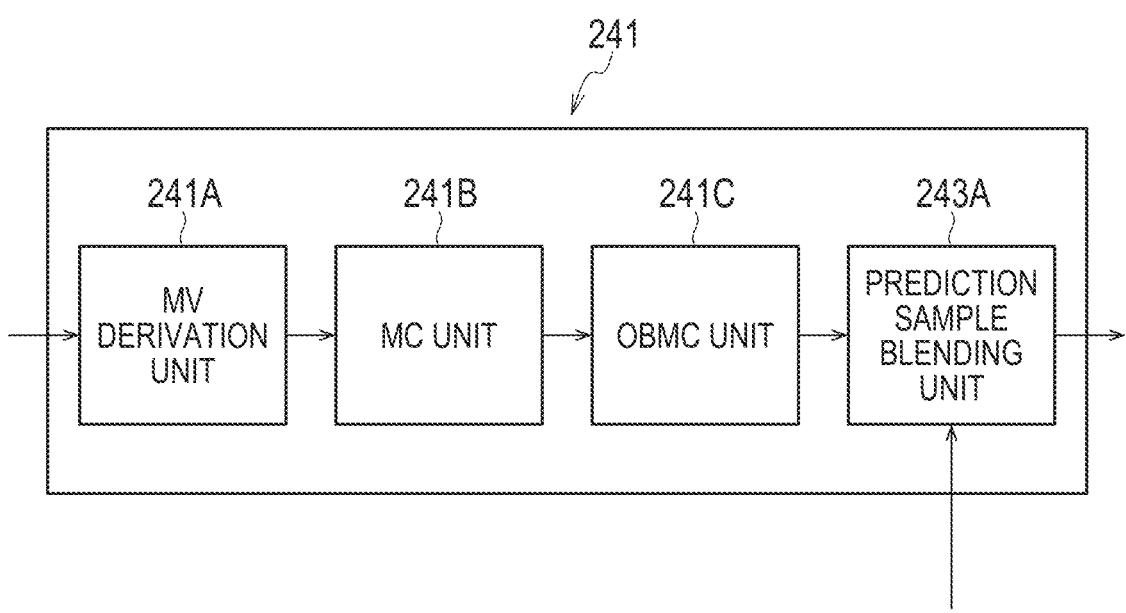
FIG. 26 is a diagram illustrating an example of functional blocks of the inter prediction unit 241 according to a method 4 (configuration 4).

In the method 4 (configuration 4), as shown in FIG. 26, the inter prediction unit 241 (111) includes an MV derivation unit 241A, an MC unit 241B, an OBMC unit 241C, and a predicted sample blending unit 243A.

Here, the MV derivation unit 241A, the MC unit 241B, and the OBMC unit 241C can have the same configuration as the MV derivation unit 241A, the MC unit 241B, and the OBMC unit 241C illustrated in FIG. 14.

Furthermore, the predicted sample blending unit 243A can have the same configuration as the predicted sample blending unit 243A of the blending unit 243 illustrated in FIG. 21

The effects expected from the above configuration are the same as those of the configuration 2.

Which one of the configurations 1 to 4 is selected may be selected according to an intention of a designer based on a trade-off between the coding performance or the decoding processing amount in the image decoding device 100 and the restriction on the memory bandwidth.

Note that, in the above description, the signaling method at the time of applying the intra prediction mode to the GPM in that case has been described with reference to the case where the rectangular block is partitioned into two parts by the GPM. However, the signaling method described in the present embodiment can be applied to a case where the rectangular block is partitioned into three or more parts by the GPM in a similar concept.

Further, the image encoding device 100 and the image decoding device 200 may be realized as a program causing a computer to execute each function (each step).

Note that the above described embodiments have been described by taking application of the present invention to the point cloud encoding device 10 and the point cloud decoding device 30 as examples. However, the present invention is not limited only thereto, but can be similarly applied to an encoding/decoding system having functions of the encoding device 10 and the decoding device 30.

According to the present embodiment, it is possible to improve the overall quality of service in video communications, thereby contributing to Goal 9 of the UN-led Sustainable Development Goals (SDGs) which is to "build resilient infrastructure, promote inclusive and sustainable industrialization and foster innovation".

What is claimed is:

1. An image decoding device comprising a circuit, wherein:
the circuit executes processes comprising:
a first process that derives motion information for a geometric partitioning mode to generate a motion compensation sample; and
a second process that derives an intra prediction mode for the geometric partitioning mode to generate an intra predicted sample, and
the first process determines that the motion information can be derived based on bi-prediction from an application area to which inter prediction is applied, in a case where a coding block is included in a B slice, intra prediction is applied to one partitioned area partitioned by the geometric partitioning mode applied to the coding block, and the inter prediction is applied to another partitioned area.

2. The image decoding device according to claim 1, wherein the first process derives the motion information based on the bi-prediction from a merge candidate list for a normal merge mode in a case where the bi-prediction is applicable to the application area of the inter prediction.

3. The image decoding device according to claim 1, wherein the first process derives the motion information based on the bi-prediction from a merge candidate list for the geometric partitioning mode in a case where the bi-prediction is applicable to the application area of the inter prediction.

4. The image decoding device according to claim 1, wherein:
the circuit further executes a third process, and
in a case where the bi-prediction is applied to the application area of the inter prediction, and in a case where the motion information based on the bi-prediction is derived, the first process selects one of a merge candidate list for a normal merge mode and a merge candidate list for the geometric partitioning mode by a predetermined flag decoded by the third process, and derives the motion information based on the bi-prediction from the selected merge candidate list.

5. The image decoding device according to claim 1, wherein the first process stores the motion information derived based on the bi-prediction applied in units of sub-blocks in a case where the motion information based on the bi-prediction is derived in a case where the bi-prediction is applied to the application area of the inter prediction.

6. The image decoding device according to claim 1, wherein the first process corrects the derived motion information by DMVR in a case where the motion information by the bi-prediction is derived to the application area of the inter prediction.

7. The image decoding device according to claim 1, wherein the first process does not correct the derived motion information by DMVR in a case where the motion information based on the bi-prediction is derived to the application area of the inter prediction.

8. The image decoding device according to claim 1, wherein in a case where the motion information based on the bi-prediction is derived into the application area of the inter prediction, and in a case where the derived motion information is corrected by the DMVR, the first process controls whether or not the OBMC can be applied for each block corrected by the DMVR in an inter prediction area.

9. An image decoding method comprising:
deriving motion information for a geometric partitioning mode to generate a motion compensation sample;
deriving an intra prediction mode for the geometric partitioning mode to generate an intra predicted sample; and
determining that the motion information can be derived based on bi-prediction from an application area to which inter prediction is applied, in a case where a coding block is included in a B slice, intra prediction is applied to one partitioned area partitioned by the geometric partitioning mode applied to the coding block, and the inter prediction is applied to another partitioned area.

10. A non-transitory computer-readable medium storing a program thereon for controlling a computer to function as an image decoding device, the computer comprising a circuit, and the program being executable to control the computer to execute processes comprising:
a first process that derives motion information for a geometric partitioning mode to generate a motion compensation sample; and
a second process that derives an intra prediction mode for the geometric partitioning mode to generate an intra predicted sample, wherein the first process determines that the motion information can be derived based on bi-prediction from an application area to which inter prediction is applied, in a case where a coding block is included in a B slice, intra prediction is applied to one partitioned area partitioned by the geometric partitioning mode applied to the coding block, and the inter prediction is applied to another partitioned area.

* * * * *